(12) United States Patent
Kuze et al.

(10) Patent No.: US 7,936,645 B2
(45) Date of Patent: May 3, 2011

(54) OPTICAL DISC DEVICE

(75) Inventors: Yuuichi Kuze, Osaka (JP); Katsuya Watanabe, Nara (JP)

(73) Assignee: Panasonic Corporation, Osaka (JP)

( * ) Notice: Subject to any disclaimer, the term of this patent is extended or adjusted under 35 U.S.C. 154(b) by 425 days.

(21) Appl. No.: 12/095,764

(22) PCT Filed: Jan. 30, 2007

(86) PCT No.: PCT/JP2007/051474
§ 371 (c)(1),
(2), (4) Date: Jun. 2, 2008

(87) PCT Pub. No.: WO2007/088843
PCT Pub. Date: Aug. 9, 2007

(65) Prior Publication Data
US 2009/0274032 A1 Nov. 5, 2009

(30) Foreign Application Priority Data
Jan. 31, 2006 (JP) ................... 2006-021923

(51) Int. Cl.
*G11B 7/00* (2006.01)
(52) U.S. Cl. .................. 369/44.23; 369/44.24
(58) Field of Classification Search ............. None
See application file for complete search history.

(56) References Cited

U.S. PATENT DOCUMENTS

| | | | |
|---|---|---|---|
| 5,297,114 A | 3/1994 | Itoh et al. | |
| 6,246,646 B1 | 6/2001 | Abe et al. | |
| 6,370,093 B1 | 4/2002 | Tada et al. | |
| 2002/0027842 A1 | 3/2002 | Komma et al. | |
| 2003/0227859 A1 | 12/2003 | Hirai | |
| 2004/0190417 A1 | 9/2004 | Watanabe et al. | |

FOREIGN PATENT DOCUMENTS

| | | |
|---|---|---|
| JP | 04-205928 | 7/1992 |
| JP | 11-039665 | 2/1999 |
| JP | 2000-200431 | 7/2000 |
| JP | 2001-084599 | 3/2001 |
| JP | 2005-332491 | 12/2005 |
| JP | 2006-338819 | 12/2006 |

OTHER PUBLICATIONS

Nakatani Morio (JP 2006-338819) with English translation.*
International Search Report for corresponding Application No. PCT/JP2007/051474 dated May 15, 2007.

* cited by examiner

*Primary Examiner* — Van N Chow
(74) *Attorney, Agent, or Firm* — Renner, Otto, Boisselle & Sklar, LLP

(57) ABSTRACT

This optical disc drive can read and/or write data from/on an optical disc 20 with multiple information layers including first and second information layers. The drive includes: a light source 3, 4 that emits the light beam; an objective lens 1; an actuator 2 for moving the objective lens perpendicularly to the information layers; a focus error generator 7 for generating a focus error signal representing how much the light beam has been converged on a target one of the information layers; and focus control means for forming a focal point of the light beam on the target information layer by driving the actuator in accordance with the focus error signal. According to the present invention, while a focus jump is being made to shift the focal point of the light beam from the first information layer of the optical disc 20 to the second information layer thereof by moving the objective lens 1, wavelengths and/or numerical apertures for the light beam are changeable while the objective lens 1 is moving.

6 Claims, 19 Drawing Sheets

NA INCREASES

NA DECREASES

OPTICAL DISC DEVICE

TECHNICAL FIELD

The present invention relates to a method for moving to a target information layer of a given information storage medium with the wavelengths or numerical apertures of a laser beam changed, but without retracting an objective lens, after the modes of focus control has been switched from ON state into hold state.

BACKGROUND ART

In optical disc technologies, data can be read out from a rotating optical disc by irradiating the disc with a relatively weak light beam with a constant intensity, and detecting the light that has been modulated by, and reflected from, the optical disc.

On a read-only optical disc, information is already stored as pits that are arranged spirally during the manufacturing process of the optical disc. On the other hand, on a rewritable or write once optical disc, a recording material film, from/on which data can be read and written optically, is deposited by an evaporation process, for example, on the surface of a substrate on which tracks with spiral lands or grooves are arranged. A phase change type recording film is used for a rewritable optical disc but an organic dye material film or any other suitable material may be used for a write once optical disc.

In writing data on a rewritable or write-once optical disc, data is written there by irradiating the optical disc with a light beam, of which the optical power has been changed according to the data to be written, and locally changing the property of the recording material film.

It should be noted that the depth of the tracks and the thickness of the recording material film are both smaller than the thickness of the optical disc base material. For that reason, those portions of the optical disc, where data is stored, define a two-dimensional plane, which is sometimes called an "information storage plane". However, considering that such an "information storage plane" actually has a physical dimension in the depth direction, too, the term "information storage plane" will be replaced herein by another term "information layer". Every optical disc has at least one such information layer. Optionally, a single information layer may actually include a plurality of layers such as a phase-change material layer and a reflective layer.

To read data that is stored on a rewritable or write-once optical disc or to write data on such an optical disc, the light beam always needs to maintain a predetermined converging state on a target track on an information layer. For that purpose, a "focus control" and a "tracking control" are required. The "focus control" means controlling the position of an objective lens perpendicularly to the information layer such that the focus position of the light beam is always located on the information layer. On the other hand, the "tracking control" means controlling the position of the objective lens along the radius of a given optical disc (which direction will be referred to herein as a "disc radial direction") such that the light beam spot is always located right on a target track.

Various types of optical discs such as DVD (digital versatile disc)-ROM, DVD-RAM, DVD-RW, DVD-R, DVD+RW and DVD+R have become more and more popular these days as storage media on which a huge amount of information can be stored at a high density. Meanwhile, CDs (compact discs) are still popular now. Recently, there is a growing demand for optical discs with storage capacities that are big enough to store high-definition data there. To meet such a demand, a Blu-ray Disc (which will be referred to herein as a "BD") was developed. A BD-RE has already been available for an affordable price as a rewritable disc, but a BD-R disc, which is a write-once disc that can be produced at a lower cost than a BD-RE, is also under development. In the meantime, an HD-DVD (high definition DVD) that complies with a different set of standards is still being developed.

Each of these optical discs such as CDs, DVDs and BDs has a principal surface (i.e., light-incoming side) and a back surface (i.e., a label side) and includes at least one information layer between them. Every optical disc has an overall thickness of approximately 1.2 mm and a diameter of either 12 cm or 8 cm.

A CD's information layer is located at a depth of about 1.1 mm as measured from the principal surface. To read data from the CD's information layer, a near-infrared laser beam (with a wavelength of 785 nm) needs to be converged such that its focal point is located right on the information layer by focus control. An objective lens for use to converge the light beam needs to have a numerical aperture (NA) of approximately 0.45. A DVD's information layer is located at a depth of approximately 0.6 mm as measured from the principal surface. In an actual DVD, two substrates, each having a thickness of approximately 0.6 mm, are boned together with an adhesive layer. In an optical disc with two information layers, the respective distances from the principal surface 2 to the information layers are approximately 0.57 mm and approximately 0.63 mm, respectively. That is to say, those two information layers are located very close to each other. To read and write data from/on the DVD's information layer, a red laser beam (with a wavelength of 660 nm) needs to be converged such that its focal point is located right on the information layer by focus control. An objective lens for use to converge the light beam needs to have a numerical aperture (NA) of approximately 0.6.

On the other hand, a BD includes a thin coating layer (light transmitting layer) with a thickness of 100 μm on the principal surface and its information layer is located at a depth of about 0.1 mm as measured from the principal surface. To read data from the BD's information layer, a blue violet laser beam (with a wavelength of 405 nm) needs to be converged such that its focal point is located right on the information layer by focus control. An objective lens for use to converge the light beam needs to have a numerical aperture (NA) of approximately 0.85. Meanwhile, an HD-DVD has a cross-sectional structure similar to that of a DVD and its information storage layer is located at a depth of about 0.6 mm as measured from the principal surface. To read data from the HD-DVD's information layer, a blue violet laser beam (with a wavelength of 405 nm) needs to be used as in BDs and an objective lens for use to converge the light beam should have a numerical aperture (NA) of 0.65 according to recently proposed specifications.

Currently, these various types of optical discs are on the market and used extensively. Under the circumstances like these, a single optical disc drive should read from, and write to, as many types of optical discs as possible. For that purpose, the optical disc drive should include a light source and an optical system, both of which can deal with multiple types of optical discs, and should appropriately recognize the type of the optical disc that has been loaded into the optical disc drive.

Meanwhile, there are optical discs with multiple information layers. FIG. 11 is a perspective view schematically illustrating the configuration of a dual-layer optical disc. Specifically, the optical disc 25 shown in FIG. 11 is a dual-layer optical disc including a first information layer 21 and a second information layer 22. More specifically, the optical disc 25 includes the first and second information layers 21, 22, a base member 24 to support these information layers 21, 22 and a protective coating 23 that covers the first information layer 21.

To read data from the first information layer 21 of this optical disc 25, a focus control needs to be carried out such that the focal point of the light beam is located on the first information layer 21. However, to get ready to read data from the second information layer 22 next while reading data from the first information layer 21, the focus position of the light beam needs to be shifted from the first information layer 21 to the second information layer 22. Such shift of the focus position will be referred to herein as a "focus jump". And to carry out the focus jump, the objective lens that converges the light beam needs to be moved perpendicularly to the information layers of the optical disc.

When the focus position of a light beam moves between information layers to carry out the focus jump, the absolute value of a focus error signal increases. That is why the focus jump should be started after the focus control has once been put on hold, or suspended. And the focus control needs to be resumed when the focal point of the light beam comes sufficiently close to the target information layer by moving the objective lens.

FIG. 12 is a graph showing a focus error signal generated from a dual-layer optical disc. In FIG. 12, the abscissa represents the position of an objective lens with respect to that optical disc and the ordinate represents the value of a focus error signal. Portions (a) through (c) of FIG. 13 are timing charts showing the timing to make a focus jump for a conventional optical disc drive. Specifically, portion (a) of FIG. 13 shows the waveform of a focus error signal during a focus jump operation. Portion (b) of FIG. 13 shows the waveform of a focus drive signal during the focus jump operation. And portion (a) of FIG. 13 is a timing chart showing the timings to turn ON and OFF the focus control during the focus jump operation.

While the objective lens is gradually moved toward the optical disc 25 shown in FIG. 11, two S-curves S1 and S2 are soon generated on the focus error signal as shown in FIG. 12. The points A and B shown in FIG. 12 represent the in-focus positions of the respective information layers.

Specifically, the S-curve S1 is generated from the first information layer 21 of the optical disc 25 shown in FIG. 11, while the S-curve S2 is generated from the second information layer 22 thereof. While a read operation is being performed on the first information layer 21, the objective lens is located at a position corresponding to the point A on the S-curve S1. If a focus jump is made in such a state, the focus error signal passes through the S-curve S1 of the first information layer 21 and an intermediate layer range 26, and then reaches a point C of the S-curve S2 generated from the second information layer 22. After that, the S-curve S2 is observed in the direction leading from the point C toward the point B.

Ideally, when the objective lens reaches a position corresponding to the point C, the objective lens is preferably braked by a focus actuator and controlled so as to stop at a position corresponding to the in-focus position B of the S-curve S2 generated from the second information layer 22. In the intermediate layer range 26, however, there could be some noise, of which the amplitude is approximately 10% of the peak value of the S-curves.

That is why even when a focus jump is made from the first information layer 21 toward the second information layer 22, it is not clear exactly when to brake the objective lens and it is difficult to stop the objective lens at the position corresponding to the in-focus position B.

For that reason, the focus control is sometimes turned ON by braking the objective lens that is located at a position corresponding to an intermediate point between the points C and B of the S-curve S2. That is to say, the objective lens may sometimes be braked after the point D has been passed and before the peak value of the S-curve S2 is reached. Or the objective lens may start being braked at the point D and finish being braked at a predetermined position between the peak value of the S-curve S2 and the point B.

First, the focus control is turned OFF at a time ta as shown in portion (c) of FIG. 13 and then an accelerating pulse is output to a focus actuator driver (not shown) from the time ta through a time tb as shown in portion (b) of FIG. 13. In the meantime, the objective lens is moved toward the optical disc. And when the focus error signal reaches a level fd at a point D (and at a time td) after having passed the point C as shown in portion (a) of FIG. 13, a decelerating pulse (i.e., a braking pulse) is output to a focus actuator driver. After that, the objective lens gradually slows down and then stops in response to a decelerating pulse at a time te, when the focus control is turned ON again and the focus jump is completed.

Patent Document No. 1: Japanese Patent Application Laid-Open Publication No. 2000-200431 (Paragraphs #22 and #23 and FIG. 5)

DISCLOSURE OF INVENTION

Problems to be Solved by the Invention

In the prior art described above, a single optical disc includes two information layers, from/on each of which data can be read and written using a light beam with the same wavelength. That is why even in making a focus jump, there is no need to change the light sources.

However, if a single optical disc has a hybrid structure in which a CD layer and a DVD layer are stacked one upon the other, for example, no focus jump may be made between those information layers. This is because the CD and DVD layers have mutually different data storage densities and require respectively different light source wavelengths and NAs to get read and write operations done. That is why no focus jump can be made between them.

Also, if a short-wave light beam is converged by an optical system with a high NA on an information layer that should be irradiated with a light beam with a long wavelength using an optical system with a low NA, then the data stored in that information layer could be destroyed. Furthermore, such an optical system with a high NA has a short focal length. For that reason, if the objective lens were moved toward the surface of the given disc to focus the light beam on such an information layer that requires an optical system with a low NA, then the objective lens would collide against the disc surface before the information layer comes into focus, which is a serious problem.

Moreover, if the type of the given disc has not been recognized yet, the wavelength and NA for reading or writing are not determined in many cases until a focus control operation is started. That is why to change the best wavelengths and/or NAs, the focus control operation should be suspended and the objective lens should be retracted away from the optical disc once. And then the light source wavelengths and/or the NAs need to be changed. According to the prior art, after the wavelengths and/or NAs have been change that way, the target information layer should be searched for and the focus control should be resumed all over again. It would take a time of 200 ms to 2 s to get this series of operations done.

In order to overcome the problems described above, the present invention has an object of providing, first and foremost, an optical disc drive that can change the optical systems in a short time by improving the method of making a focus jump between information layers of different types.

Means for Solving the Problems

An optical disc drive according to the present invention is designed to read and/or write data from/on an optical disc with multiple information layers including first and second information layers. The optical disc is a hybrid optical disc in which in reading data from the first information layer with a light beam, wavelength and/or numerical aperture for the light beam are/is different from the one(s) used to read data from the second information layer. The drive includes: a light source that emits the light beam; an objective lens that converges the light beam; perpendicular move means for moving the objective lens perpendicularly to the information layers; converged state detecting means for generating a signal representing how much the light beam has been converged on a target one of the information layers; and focus control means for forming a focal point of the light beam on the target information layer by driving the perpendicular move means in accordance with the signal. While a focus jump is being made to shift the focal point of the light beam from the first information layer of the optical disc to the second information layer thereof by driving the perpendicular move means and moving the objective lens, wavelengths and/or numerical apertures for the light beam are changeable while the objective lens is moving.

In one preferred embodiment, the optical disc drive further includes a jump direction determining section that determines, according a variation in the numerical aperture, which direction the objective lens should go while the focus jump is being made.

In this particular preferred embodiment, if it has been determined that the objective lens go toward the optical disc, a positive accelerating pulse and a negative decelerating pulse are applied in this order to the perpendicular move means. On the other hand, if it has been determined that the objective lens go away from the optical disc, a negative accelerating pulse and a positive decelerating pulse are applied in this order to the perpendicular move means.

In another preferred embodiment, the light source can emit multiple light beams with mutually different wavelengths, including a first light beam for the first information layer of the optical disc and a second light beam for the second information layer thereof. While the focus jump is being made, the light beams to irradiate the optical disc with are changed between the first and second light beams.

In still another preferred embodiment, the optical disc drive further includes means for changing the sizes of the beam cross section of the light beam to irradiate the optical disc with while the focus jump is being made.

In yet another preferred embodiment, while the focus jump is being made, the objective lens is not retracted to a disc collision avoiding position.

In yet another preferred embodiment, while being accelerated during the focus jump, the perpendicular move means is given at least one pulse drive instruction. Either while the pulse drive accelerate instruction is being issued or after the accelerate instruction has been given, the wavelengths or the numerical apertures for the light beam are changed.

In yet another preferred embodiment, after the wavelengths or the numerical apertures for the light beam have been changed and when an output signal of the converged state detecting means reaches a predetermined level, a decelerate instruction is given to the perpendicular move means.

In yet another preferred embodiment, the objective lens includes a number of objective lenses, which are changed when the wavelengths are changed for the light beam.

In yet another preferred embodiment, the objective lens includes a number of objective lenses, and the numerical apertures are changed by changing the objective lenses.

In yet another preferred embodiment, the optical disc drive further includes focus finding means that starts a focus control on a target information layer. When the shift of the focal point of the light beam from the first information layer to the second information layer fails, the focus finding means performs a focus finding operation on the second information layer with the wavelengths or the numerical apertures changed for the light beam.

In yet another preferred embodiment, while the wavelengths or the numerical apertures are being changed for the light beam, the focus control means puts a drive signal for the perpendicular move means on hold.

Another optical disc drive according to the present invention is designed to read and/or write data from/on an optical disc with at least one information layer. The drive includes: a light source that emits a light beam; an objective lens that converges the light beam; perpendicular move means for moving the objective lens perpendicularly to the information layer; converged state detecting means for generating a signal representing how much the light beam has been converged on the information layer; and focus control means for forming a focal point of the light beam on a target information layer by driving the perpendicular move means in accordance with the signal. The output of the focus control means is put on hold while the focal point of the light beam is located on the information layer, wavelengths and/or numerical apertures are changed for the light beam, and then the focal point of the light beam is shifted to somewhere else within the same target information layer.

In one preferred embodiment, if the numerical apertures are changed, an accelerating pulse and a decelerating pulse are applied to the output of the focus control that is put on hold.

In this particular preferred embodiment, the timing to change the numerical apertures is either while an instruction to accelerate the objective lens is being given to the perpendicular move means or after the instruction has been given to the perpendicular move means.

In another preferred embodiment, the wavelengths of the light beam are also changed while the numerical apertures are being changed.

EFFECTS OF THE INVENTION

An optical disc drive according to the present invention can change the optical systems (or light source wavelengths and/or numerical apertures) without retracting the objective lens while a focus jump is being made, and therefore, can shift the focus between multiple types of information layers in a short time. As a result, in a hybrid optical disc in which a DVD layer (which is an information layer compliant with the DVD standards) and a BD layer (which is an information layer compliant with the BD standards) are stacked one upon the other, for example, data can finish being read or written from/on multiple information layers compliant with different standards in a short time in accordance with the user's instruction. Thus, SD quality video and high-quality music for audio equipment may be stored in the DVD layer and HD quality video such as movies may be stored in the BD layer, for example. Consequently, a hybrid disc can come in much handier for general consumers.

Figure 18:
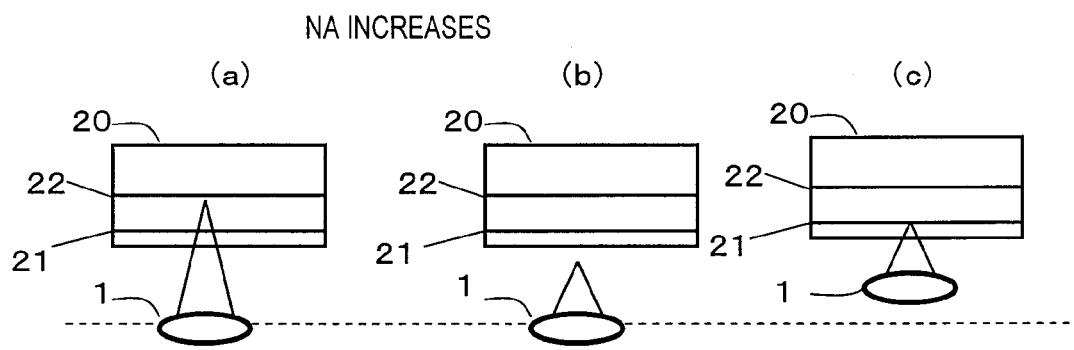

Portions (a) through (c) of FIG. 18 schematically show the positions of an objective lens.

Figure 19:
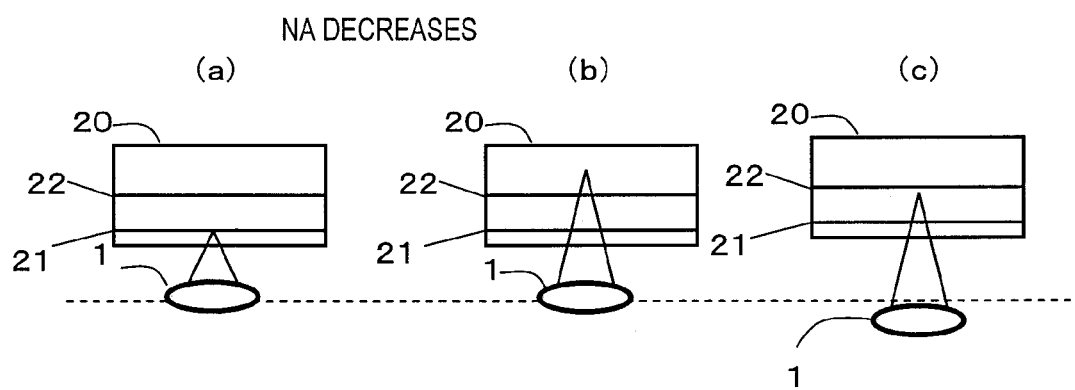

Portions (a) through (c) of FIG. 19 schematically show the positions of an objective lens.

Figure 20:
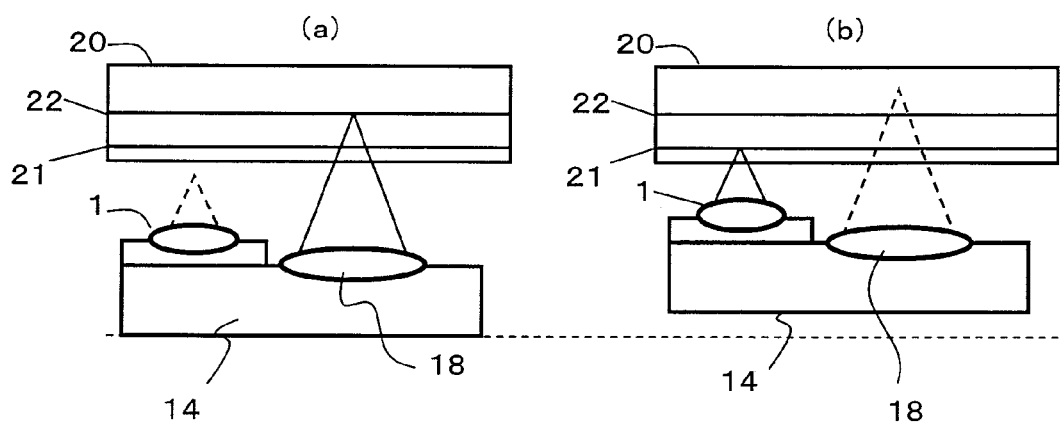

Portions (a) and (b) of FIG. 20 schematically show the positions of an objective lens holder.

Figure 21:
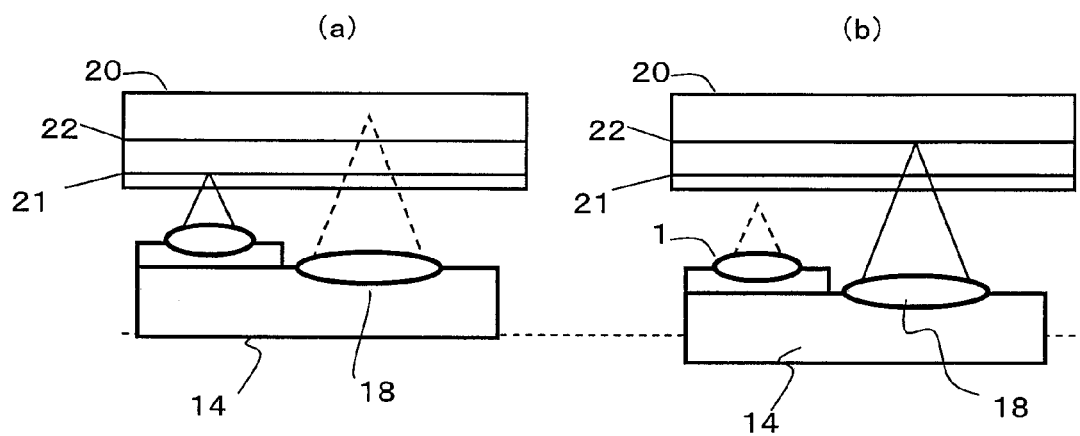

Portions (a) and (b) of FIG. 21 schematically show the positions of an objective lens holder.

Figure 22:
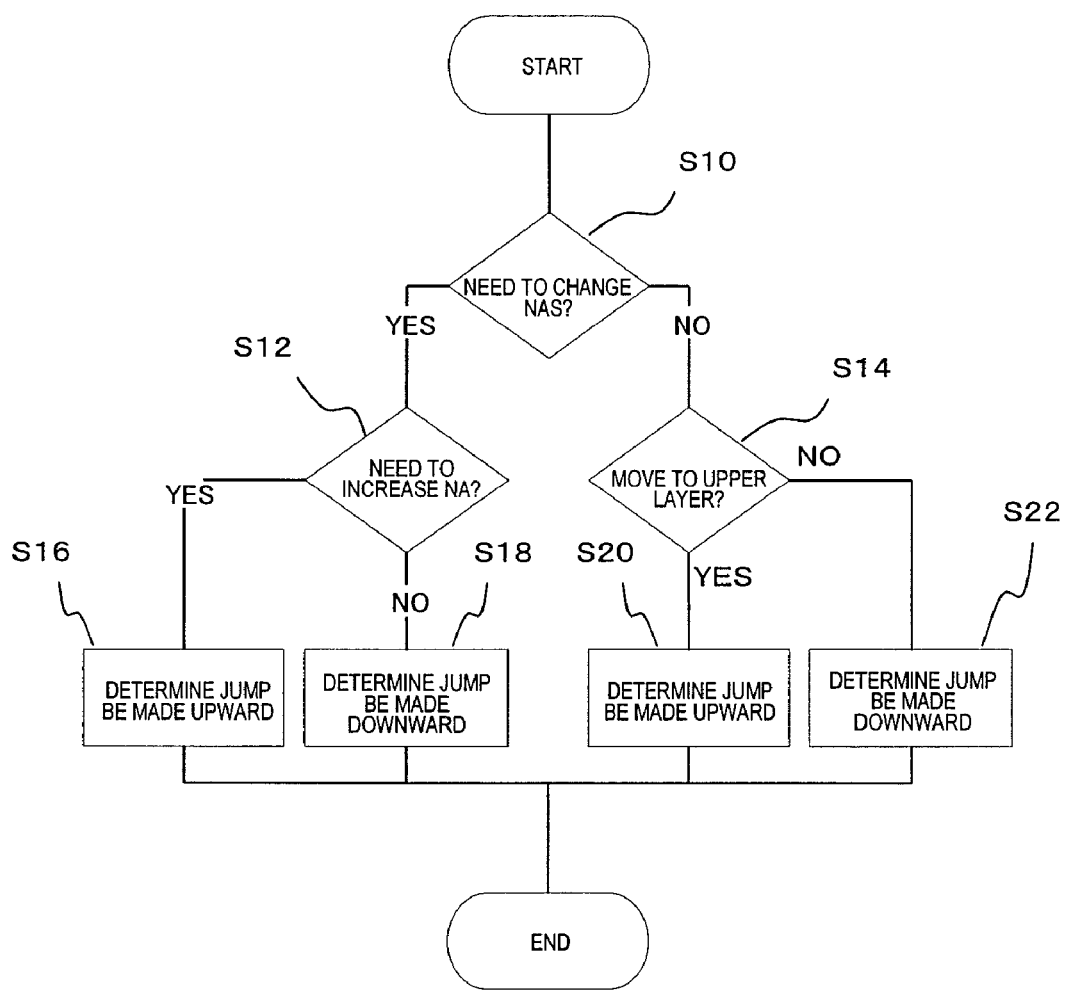

FIG. 22 is a flowchart showing how the jump direction and distance calculating section operates in an optical disc drive according to the present invention.

| DESCRIPTION OF REFERENCE NUMERALS | |
|---|---|
| 1 | objective lens |
| 2 | actuator |
| 3 | first light source |
| 4 | second light source |
| 5 | photodetector |
| 6 | preamplifier |
| 7 | focus error generator |
| 8 | microcomputer |
| 9 | focus actuator driver |
| 10 | disc motor |
| 11 | light source changing section |
| 12 | NA changer |
| 13 | NA changing section |
| 14 | objective lens holder |
| 15 | jump drive generating section |
| 17 | focus control section |
| 18 | objective lens B |
| 20 | optical disc |
| 21 | first information layer |
| 22 | second information layer |

-continued

DESCRIPTION OF REFERENCE NUMERALS

| | |
|---|---|
| 23 | protective coating |
| 24 | base member |
| 25 | dual-layer optical disc |
| 26 | intermediate layer range |
| 27 | protective coating range |
| 28 | base member range |
| 31 | jump direction and distance calculating section |

BEST MODE FOR CARRYING OUT THE INVENTION

A preferred embodiment of an optical disc drive according to the present invention can change optical systems (or light source wavelengths and/or NAs) even without retracting an objective lens during a focus jump operation. For example, in a hybrid optical disc in which a DVD layer (which is an information layer compliant with the DVD standards) and a BD layer (which is an information layer compliant with the BD standards) are stacked one upon the other, data can be read or written smoothly from/on multiple information layers compliant with different standards.

Hybrid optical discs currently under development may have the structures shown in the following Tables 1 through 4:

TABLE 1

| Structure of information layer | Wavelength | NA |
|---|---|---|
| $1^{st}$ information layer compliant with HD-DVD standards | 405 nm | 0.65 |
| $2^{nd}$ information layer compliant with DVD standards | 650 nm | 0.6 |

TABLE 2

| Structure of information layer | Wavelength | NA |
|---|---|---|
| $1^{st}$ information layer compliant with BD standards | 405 nm | 0.85 |
| $2^{nd}$ information layer compliant with HD-DVD standards | 405 nm | 0.65 |

TABLE 3

| Structure of information layer | Wavelength | NA |
|---|---|---|
| $1^{st}$ information layer compliant with BD standards | 405 nm | 0.85 |
| $2^{nd}$ information layer compliant with DVD standards | 650 nm | 0.6 |

TABLE 4

| Structure of information layer | Wavelength | NA |
|---|---|---|
| $1^{st}$ information layer compliant with BD standards | 405 nm | 0.85 |
| $2^{nd}$ information layer compliant also with BD standards | 405 nm | 0.85 |
| $3^{rd}$ information layer compliant with DVD standards | 650 nm | 0.6 |

According to the structure shown in Table 1, the two information layers require close NAs, and there is no need to change NAs in making a focus jump. However, as the light beams should have different wavelengths, the light sources should be changed.

Conversely, according to the structure shown in Table 2, the two information layers require significantly different NAs, and the NAs need to be changed in making a focus jump. Meanwhile, as the light beams may have the same wavelength, there is no need to change the light sources.

According to the structure shown in Table 3, the two information layers require significantly different NAs and light beams with quite different wavelengths, and both the NAs and the light sources need to be changed to make a focus jump.

And in the structure shown in Table 4, the three information layers include a pair that requires significantly different NAs and light beam wavelengths and a pair that requires the same NA and the same light beam wavelength. In that case, in making a focus jump, the NAs and the light sources may sometimes need to be changed both and may sometimes be unchanged.

As can be seen from these examples, there are various types of hybrid optical discs with multiple different combinations of information layers. That is why according to the present invention, the optical disc may have at least one of those various structures. Nevertheless, a single optical disc drive does not have to be designed to be compatible with each and every type of optical disc shown in these tables. For example, an optical disc drive according to the present invention may be designed so as to be compatible with optical discs of the type shown in Table 1 but not compatible with optical discs of the type shown in Table 2 or 3.

It should be noted that if an optical disc drive is designed to change both light beam wavelengths and NAs, that optical disc drive is also compatible with optical discs that require change of either wavelengths or NAs only (e.g., the optical discs shown in Tables 1 and 2).

The first through fourth preferred embodiments of the present invention to be described below are optical disc drives that are designed to be compatible with the optical discs shown in Tables 1 to 4, respectively. However, the optical disc drive of the present invention is in no way limited to those specific preferred embodiments but may also have any other specific configuration as well.

It should be noted that even if no focus jump needs to be made, the wavelengths of a light beam or the NAs sometimes need to be changed. For example, if a single optical disc drive is designed to be compatible with multiple types of optical discs such as DVDs and BDs, the operation of recognizing the type of an optical disc that the optical disc drive has been loaded with should be performed. In performing this type recognition operation, the given optical disc may be irradiated with a short-wave light beam for BDs, for example. However, if the given optical disc has turned out to be a DVD as a result of the irradiation, then the wavelengths of the light beam and the NAs should be changed. Even so, if the wavelengths and NAs can be changed without retracting the objective lens, the focus can also be shifted quickly.

EMBODIMENT 1

Hereinafter, a first preferred embodiment of an optical disc drive according to the present invention will be described with reference to FIG. 1, which is a block diagram illustrating a configuration for an optical disc drive according to this preferred embodiment.

The optical disc drive of this preferred embodiment can read and write data from/on an optical disc 20 including multiple information layers such as those shown in Table 1.

When loaded into the optical disc drive, the optical disc 20 starts to be rotated by a disc motor 10 at a predetermined rotational frequency.

This optical disc drive has a light source unit including a first light source 3 and a second light source 4, which emit light beams with mutually different wavelengths. In the drawings, the first and second light sources 3 and 4 are labeled as "light source A" and "light source B", respectively, for the sake of simplicity. In this preferred embodiment, the first and second light sources 3 and 4 are both arranged in the same optical pickup. The optical pickup includes not only the light sources 3, 4 but also an objective lens 1 that converges the light beams emitted from the light sources 3, 4, a focus actuator 2 that changes the positions of the objective lens 1 along its optical axis, and a photodetector 5 that receives the light beam reflected from the optical disc 20 to generate an electrical signal. An actuator actually arranged in an optical pickup can move the objective lens 1 not just in the optical axis direction but also in a direction perpendicular to that optical axis direction. More specifically, the actuator includes the focus actuator 2 and a tracking actuator (not shown), and the position of the objective lens 1 in the optical axis direction is adjusted by the focus actuator 2 in the optical pickup. On the other hand, the position of the objective lens 1 in the direction perpendicular to the optical axis thereof is adjusted by the tracking actuator (not shown) in the optical pickup.

Although not shown, a transport stage to move the optical pickup in its entirety in the radial direction of the optical disc is arranged in this optical disc drive.

The photodetector 5 includes a number of photodiodes and generates photocurrent representing the intensities (or quantities) of the light that has been incident on those photodiodes. Based on the output of the photodetector 5, a focus error (FE) signal, a tracking error (TE) signal, a read signal and other signals will be generated.

The output of the photodetector 5 (i.e., the photocurrent) is supplied to a preamplifier 6, where the photocurrent is transformed into a voltage signal. The output of the preamplifier 6 is supplied to a focus error generator 7 that functions as converged state detecting means. The focus error generator 7 receives the output of the preamplifier 6, thereby generating a focus error signal, which is passed to a focus control section 17 functioning as focus control means. In response, the focus control section 17 performs a filter operation on the focus error signal. Then, the output of the focus control section 17 is supplied to a focus actuator driver 9.

The position of the objective lens 1 in the optical axis direction is adjusted by the focus actuator 2 in the optical pickup. Specifically, when supplied with drive current from the focus actuator driver 9, a coil (not shown) in the focus actuator 2 generates a magnetic field, thereby moving the objective lens 1 substantially perpendicularly to the information layer of the optical disc 20 with its magnetic force. In this preferred embodiment, the greater the amount of the drive current flowing through the coil in the focus actuator 2, the closer to the optical disc 2 the objective lens 1 gets.

The magnitude of the drive current flowing from the focus actuator driver 9 is controlled in accordance with the signal supplied from the focus control section 17 to the focus actuator driver 9 while the focus control is ON. On the other hand, while the focus control is OFF during a focus jump operation, the magnitude of the drive current flowing from the focus actuator driver 9 is controlled in accordance with the signal supplied from a jump drive generating section 15 to the focus actuator driver 9.

While the focus control is ON, the position of the objective lens 1 is adjusted such that the focus error signal has zero amplitude. As a result, the focal point of the light beam will be located on the target information layer of the optical disc 20.

In accordance with the instruction given by a microcomputer 8, the jump drive generating section 15 controls the focus actuator driver 9 with accelerating and decelerating pulse signals, thereby accelerating and decelerating the objective lens 1 to get the focus jump done. In this preferred embodiment, the jump drive generating section 15 generates a pulse signal to make a focus jump and sends it to the focus actuator driver 9. As a result, the focal point of the light beam that has been located on the first information layer of the optical disc 20 may be shifted to the second information layer thereof, for example.

The microcomputer 8 controls the focus control section 17, the jump drive generating section 15, the disc motor 10 and a light source changing section 11.

Data is read from, or written on, the optical disc 20 with a focus control and a tracking control carried out such that the light beam spot follows a target track on a target information layer. Specifically, data is read by subjecting the output of the preamplifier 6 to waveform equalization and clock extraction and thereby converting the stored data into digital data. Then, this digital data is subjected by a decoder (not shown) to demodulation, error correction, and de-scrambling, thereby generating read data. On the other hand, in writing user data on the optical disc 20, an encoder (not shown) scrambles the user data to be written, adds an error correction code to it and modulates it, thereby generating an encoded write signal. A write processing section (not shown) receives the write signal from the encoder, transforms the signal into multiple pulses and performs write compensation processing on it, thereby generating a laser emission pulse signal. A laser driver section receives the laser emission pulse signal and modulates the power of the light beams emitted from the light sources 3 and 4.

The optical disc drive of this preferred embodiment includes the light source changing section 11 for changing the light sources of the light beam to irradiate the optical disc 20 with between the light sources 3 and 4. By adopting such a configuration, data can be read from the optical disc 20 with either the light beam emitted from the first light source 3 or the one emitted from the second light source 4. It is determined by the light source currently selected by the light source changing section 11 which of these two light beams should be used to read or write data from/on the disc. In FIG. 1, the light beam emitted from the first light source 3 is supposed to be just converged by the objective lens 1 for the sake of simplicity. Actually, however, a beam splitter, a collimator lens and other optical elements (none of which are shown) are interposed between the first light source 3 and the objective lens 1. Thus, the light beam emitted from the second light source 4 will also be converged by the objective lens 1 after having been transmitted through those additional optical elements. The first and second light sources 3 and 4 may be implemented as two different semiconductor laser packages or integrated together on the same substrate. The light source changing section 11 selectively supplies drive current to one of these two light sources 3 and 4 after another, thereby energizing the selected light source.

Hereinafter, it will be described how the optical disc drive of this preferred embodiment operates.

Figure 11:
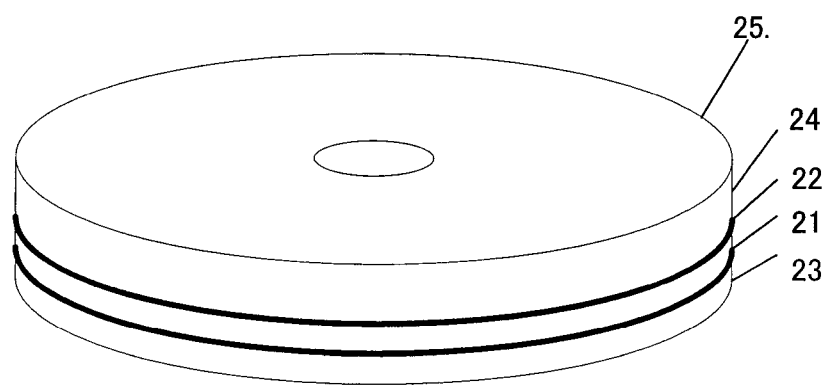
FIG. 11 is a perspective view illustrating an optical disc with a two-layer structure.

In this preferred embodiment, the optical disc 20 is supposed to have the same structure as the hybrid disc shown in FIG. 11. That is to say, the optical disc 20 has the structure shown in Table 1. Specifically, the first information layer is compliant with the HD-DVD standards that are compatible with an optical system that requires a wavelength of 405 nm and an NA of 0.65. On the other hand, the second information layer 22 is compliant with the DVD standards that are compatible with an optical system that requires a wavelength of 650 nm and an NA of 0.6. These information layers are accessed with light beams that have significantly different wavelengths but close NAs. That is why the NAs do not have to be changed to make a focus jump.

In performing a read/write operation on such an optical disc 20, a light beam is converged on one of these two information layers 21 and 22. In reading or writing data from/on the first information layer 21, a blue violet light beam emitted from the first light source 3 with a wavelength of approximately 405 nm is used but the second light source 4 is emitting no red light beam with a wavelength of approximately 650 nm.

First, the light beam emitted from the first light source 3 is supposed to be converged by the objective lens 1 to form a light beam spot on the first information layer 21 of the optical disc 20. The light reflected from the optical disc 20 is incident on the photodetector 5 by way of the objective lens 1. In this preferred embodiment, the photodetector 5 has four divided areas, generates photocurrents based on the intensities of the light that have been detected at those areas, and supplies them to a preamplifier 6. The preamplifier 6 converts the incoming photocurrents into voltages using an I/V converter. And the converted signals are passed to the focus error generator 7.

The focus error generator 7 generates a focus error signal by an astigmatism method based on the four outputs of the preamplifier 6 corresponding to the four output signals of the quadruple photodetector 5. The focus error signal is subjected to a filter operation such as phase compensation or gain compensation by the focus control section 17 and the processed signal is output to the focus actuator driver 9.

In accordance with the drive signal supplied from the focus actuator driver 9, the objective lens 1 is driven by the focus actuator 2, thereby performing a focus control such that the light beam spot has a predetermined converged state with respect to the first information layer of the optical disc 20. While the focus control is ON, even if the rotating optical disc 20 caused out-of-plane vibrations, the objective lens 1 would move up and down to keep up with the flutter of the optical disc 20. As a result, the focal point of the light beam could always be located right on the first information layer.

In the innermost area of the optical disc 20, there is an area in which management information is stored. By reading data from that area, it can be seen what type of structure the given optical disc 20 has. As for a hybrid optical disc, it is determined, based on the information retrieved, what standards its information layers are compliant with.

If a read/write operation needs to be performed on the second information layer 22 while a read/write operation is being performed, or after a read/write operation has been performed, on the first information layer 21, then a focus jump should be made from the first information layer 21 to the second information layer 22. The focus jump may be made in response to a user's request that has been sent through some input device such a remote controller (not shown). To make a focus jump, first, the microcomputer 8 shown in FIG. 1 puts a focus control on the first information layer 21 on hold. That is to say, the microcomputer 8 outputs a hold ON instruction to the focus control section 17. When the focus control section 17 puts the output to the focus actuator driver 9 on hold in accordance with the hold ON instruction, the microcomputer 8 gives a focus jump instruction to the jump drive generating section 15. Once the statuses of the focus control have been changed from ON state into hold state, the operation of making the objective lens 1 keep up with the flutter of the optical disc is no longer performed. Since it takes just a short time to change the light sources as will be described later, the gap between the optical disc 20 and the objective lens 1 hardly changes while the light sources are being changed. Also, as soon as the statuses of the focus control are changed from the ON state into the hold state, the jump drive generating section 15 outputs an accelerating pulse to the focus actuator driver 9 in accordance with the instruction given by the microcomputer 8 such that the light beam spot formed by the objective lens 1 shifts from the first information layer 21 to the second information layer 22.

While the focal point of the light beam is shifting from the first information layer 21 to the second information layer 22, the microcomputer 8 outputs a light source change signal to the light source changing section 11. In accordance with the instruction given by the microcomputer 8, the light source changing section 11 stops the emission of the blue violet light beam from the first light source 3 but starts the emission of a red light beam from the second light source 4 instead. It will take 1 ms or less to change the light sources. After the red light beam has started to be emitted, the microcomputer 8 sees, based on the focus error signal that is the output signal of the focus error generator 7, if the focus error signal has reached a predetermined level, and then outputs a decelerate instruction to the jump drive generating section 15. In accordance with the instruction given by the microcomputer 8, the jump drive generating section 15 outputs a decelerating pulse to the focus actuator driver 9.

When finding, based on the focus error signal, the focal point of the red light beam located right on the second information layer 22 (i.e., when finding the focus error signal equal to zero), the microcomputer 8 outputs a hold OFF instruction to the focus control section 17. In accordance with the instruction given by the microcomputer 8, the focus control section 17 releases hold on the output and resumes the focus control. In this manner, a focus jump is complete.

After that, the deviation (or error) between the focal point of the red light beam and the second information layer 22 will be detected based on the focus error signal, and the focus control section 17 and the focus actuator driver 9 control the position of the objective lens 1. That is to say, a feedback control is carried out such that the deviation between the focal point of the red light beam and the second information layer 22 becomes equal to zero.

The conventional optical disc drives make a focus jump just by shifting the focus position without changing the wavelengths of the light beam during the jump. And if the wavelengths of the light beam need to be changed, then the focus control is turned temporarily OFF from ON state and the objective lens is retracted to its rest position once according to the conventional technique. After that, the wavelengths of the light beam are changed and then a focus search (or focus finding) operation is carried out to shift the focal point to the target information layer with the objective lens moved from the rest position toward the optical disc all over again. And when the focal point reaches the target information layer, the focus control is turned ON from the OFF state. That is why according to the conventional technique, it would take a time of approximately 200 ms to 2 s to resume the focus control on the target information layer.

In contrast, the optical disc drive of this preferred embodiment changes the light sources with the focus control temporarily put on hold, thus saving the extra time that would otherwise be needed before the focus control can be resumed. As a result, the focus control can be resumed in less than about 2 ms.

Hereinafter, it will be described more fully with reference to FIG. 2 how to make a focus jump according to this preferred embodiment.

Figure 12:
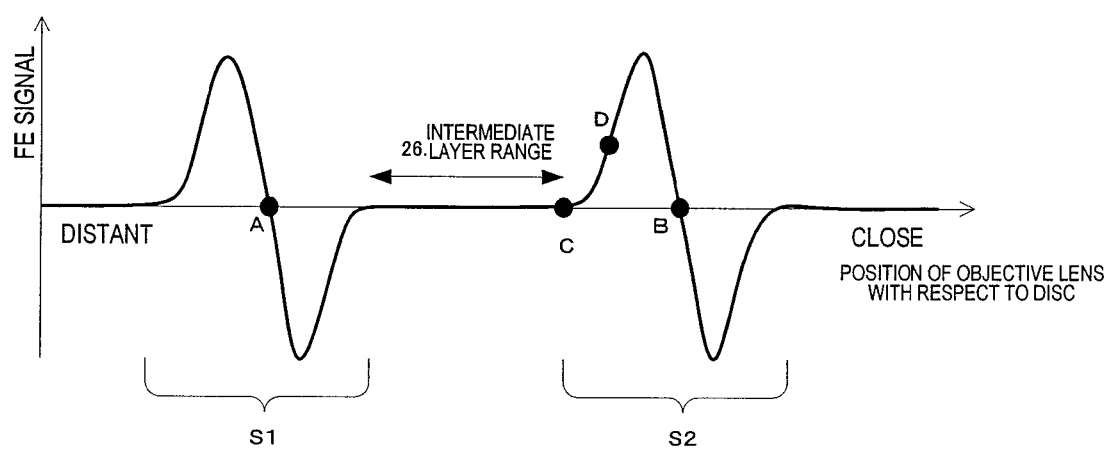
FIG. 12 shows the S-curves of a focus error signal generated from an optical disc with two information layers.
Figure 13:
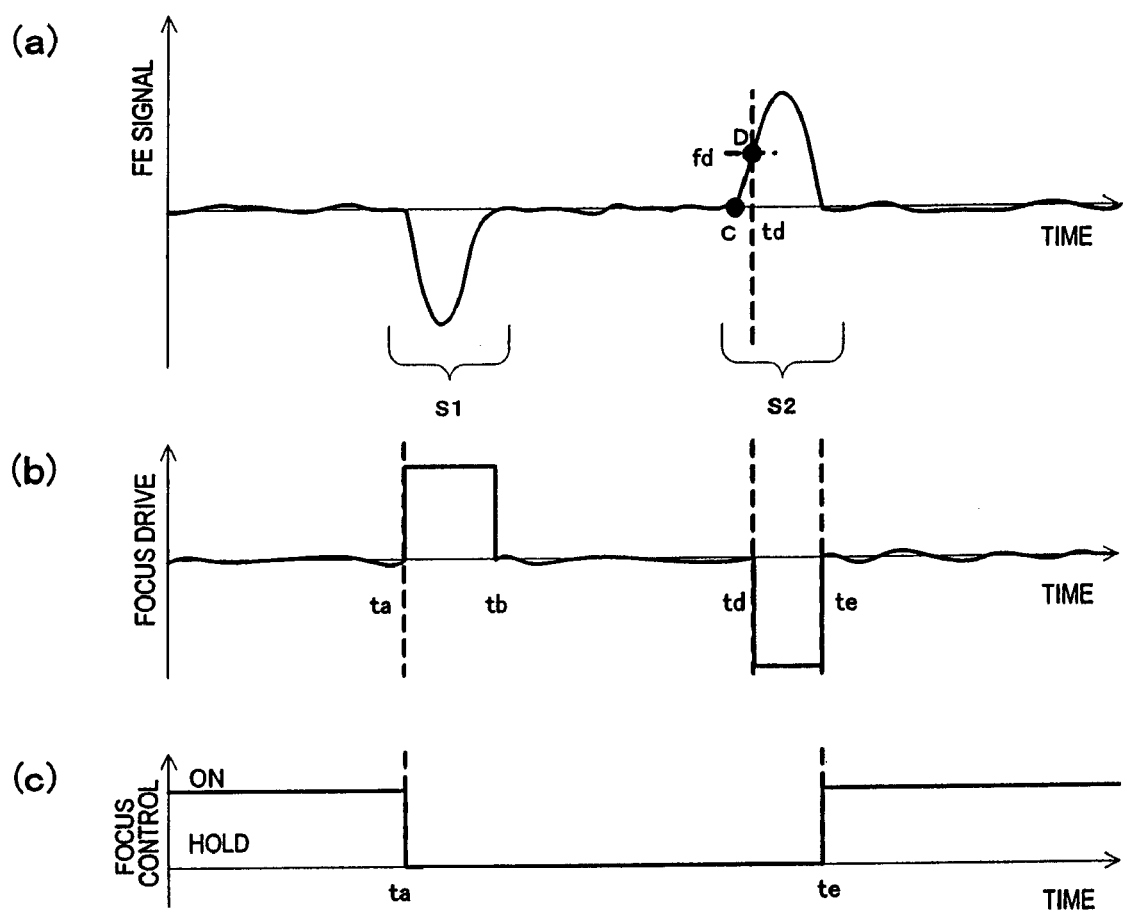
FIG. 13 shows focus jump timing diagrams for a conventional optical disc drive, wherein portion (a) shows the waveform of a focus error signal during a focus jump operation, portion (b) shows the waveform of a focus drive signal during the focus jump operation, and portion (c) shows the timings to turn ON and OFF a focus control during the focus jump operation.

First, suppose a focus control is being carried out such that the focal point is located at the in-focus position of the first information layer 21 (corresponding to the point A shown in FIG. 12). In that case, the focus error signal continues to be approximately equal to zero as in the period preceding a time ta as shown in portion (a) of FIG. 2. In that period, the light beam is emitted from the first light source 3 and no light beam is emitted from the second light source 4.

Figure 2:
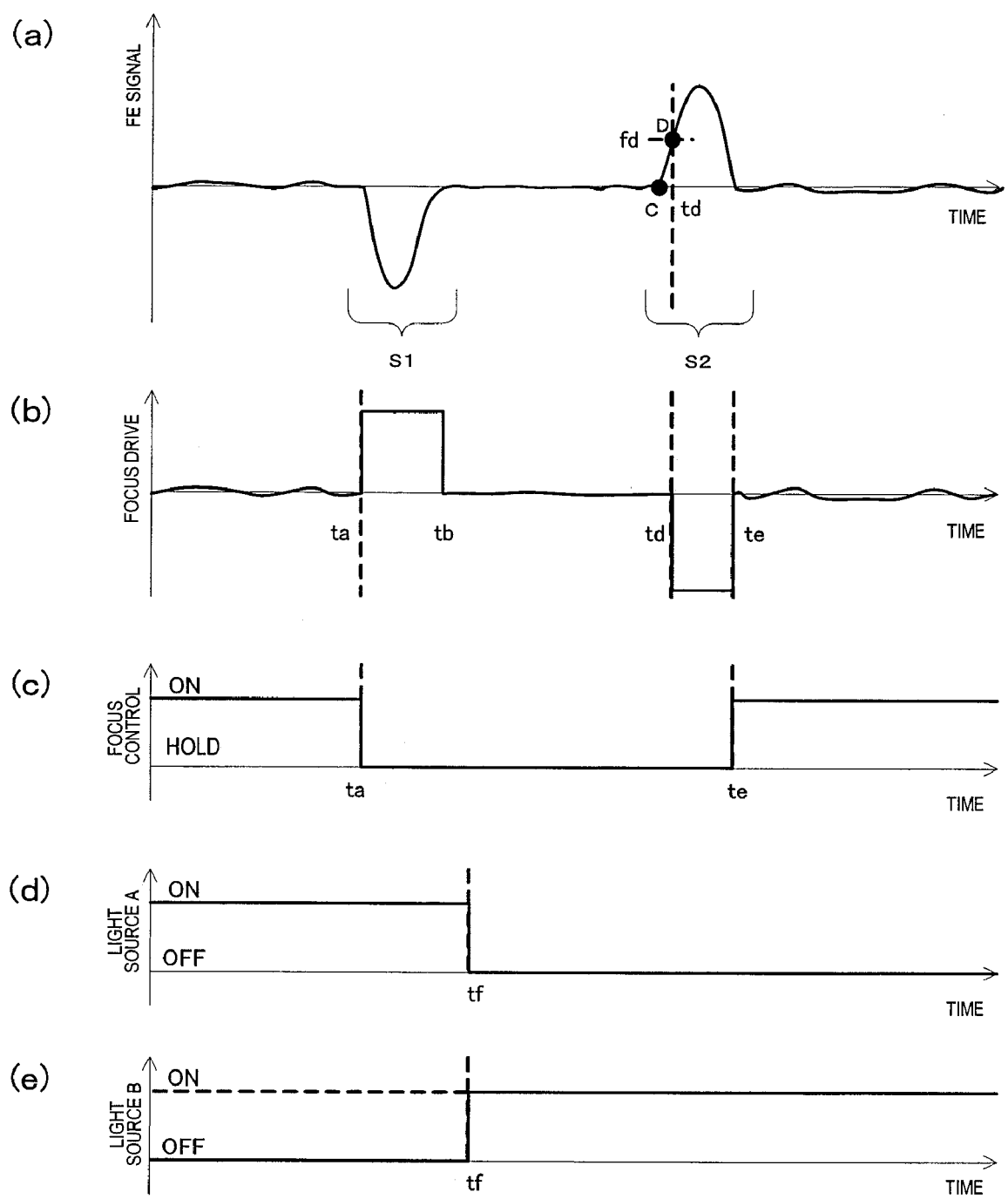
FIG. 2 shows focus jump timing diagrams according to the first preferred embodiment, wherein portion (a) shows the waveform of a focus error signal during a focus jump operation, portion (b) shows the waveform of a focus drive signal during the focus jump operation, portion (c) shows the timings to turn ON and OFF a focus control during the focus jump operation, portion (d) shows the timings to turn ON and OFF light source A during the focus jump operation and portion (e) shows the timings to turn ON and OFF light source B during the focus jump operation.

At that time ta, the microcomputer 8 changes the statuses of the focus control section 17 from the ON state into the hold ON state and puts its output on hold as shown in portion (c) of FIG. 2. Meanwhile, in the period between the times ta and tb, the jump drive generating section 15 outputs an accelerating pulse (or accelerate instruction) to the focus actuator driver 9 as shown in portion (b) of FIG. 2. As a result, a drive signal, which is the sum of the output that has been put on hold and the accelerating pulse, is supplied to the focus actuator driver 9. Due to the application of the accelerating pulse, the objective lens 1 starts to be moved toward the optical disc 20 by the focus actuator driver 9 and the focus actuator 2.

The accelerate instruction (which corresponds to the first instruction) is an instruction to drive the objective lens 1 so as to increase its relative velocity with respect to the optical disc 20. On the other hand, the decelerate instruction (which corresponds to the second instruction) is an instruction to drive the objective lens 1 so as to decrease its relative velocity with respect to the optical disc 20. That is why the objective lens 1 in stopped state (i.e., having a relative velocity of zero with respect to the optical disc 20) starts to move first in response to the accelerate instruction and then stops in response to a decelerate instruction. This does not depend on the direction in which the lens is going. The direction of acceleration (i.e., the direction to go for the lens) is defined by the polarity of the accelerating pulse. Specifically, if the objective lens 1 is moved toward the optical disc 20, the polarity of the accelerating pulse is positive. On the other hand, if the objective lens 1 is moved away from the optical disc 20, then the polarity of the accelerating pulse is negative. The decelerating pulse is always applied after the accelerating pulse. And the polarity of the decelerating pulse is opposite to that of the accelerating pulse.

In making a focus jump, first, in response to the accelerate instruction, the objective lens 1 is driven in such a direction as to make the converged spot of the light beam leave the information layer that is currently irradiated with that light beam. After that, in response to the decelerate instruction, the relative velocity of the converged spot of the light beam with respect to the target information layer is decreased and the objective lens 1 is driven such that the converged spot of the light beam stops at the target information layer.

After the focus jump operation has been started, the microcomputer 8 outputs a light beam source change instruction to the light source changing section 11 at a time tf. In accordance with the instruction given by the microcomputer 8, the light source changing section 11 stops the emission from the first light source 3 and starts the emission from the second light source 4 as shown in portions (d) and (e) of FIG. 2. In this manner, while the focus position of the light beam is located in the range of the S-curve S1 or the intermediate layer range 26 shown in FIG. 12, the light sources are changed into the other one.

As the objective lens 1 is moved, the focus position of the light beam passes the point C shown in portion (a) of FIG. 2 and the focus error signal begins to increase. In this case, the focus error signal is generated based on the light beam that has been emitted from the second light source 4 and then reflected from the second information layer 22.

When the focus error signal reaches a level fd (corresponding to the point D) at a time td, the jump drive generating section 15 outputs a decelerating pulse to the focus actuator driver 9 in accordance with the instruction given by the microcomputer 8 as shown in portion (b) of FIG. 2. As a result, the objective lens 1 is gradually decelerated and the jump drive generating section 15 stops outputting the decelerating pulse at a time te.

At the time te, the microcomputer 8 turns the focus control section 17 ON again from the OFF state to finish the focus jump operation as shown in portion (c) of FIG. 2.

In the example described above, the focus jump is supposed to be made from the first information layer 21 to the second information layer 22. However, according to this preferred embodiment, the focus jump can also be made in the same way from the second information layer 22 to the first information layer 21.

In the preferred embodiment described above, the objective lens 1 is braked at a time when the objective lens 1 is located at a position corresponding to somewhere between the points C and B of the S-curve S2 shown in FIG. 12 to turn the focus control ON. In this case, the brake may be applied at some point in time between the point D and the peak value of the S-curve. Alternatively, the brake may be applied at the point D and kept ON until a predetermined point between the peak value of the S-curve S2 and the point B is reached.

Optionally, to control the timing to apply the brake, a reference level may be set at a predetermined percentage of the peak-to-peak value of the S-curve and the brake may be applied at that reference level.

Also, the time tf to change the light sources is supposed to be set between the time tb when the accelerating pulse finishes being applied and the time td when the decelerating pulse starts to be applied. Alternatively, the light sources may be changed while the accelerating pulse is being output (i.e., between the times ta and tb). The interval between the times ta and tb is about 0.1 ms to about 1 ms. The interval is this short while the focus control is put on hold. If the optical disc 20 had a significant disc flutter, however, no S-curve S2 could be detected when the focus control is resumed. To minimize the influence of the disc flutter, the focus jump is preferably made near the innermost area of the optical disc. Also, if the S-curve S2 cannot be detected, it may be determined that the focus jump has failed. In that case, a recovery operation should be performed by retracting the objective lens 1 once and by performing a focus finding operation on the second information layer 22 with the light beam emitted from the second light source 4.

The first and second light sources 3 and 4 are supposed to emit a blue violet light beam and a red light beam, respectively. However, the colors (or wavelengths) of the light beams emitted are not limited to this example. The structure of the optical disc 20 is not limited to the example described above, either. Instead, the optical disc 20 may have three or more information layers.

In the preferred embodiment described above, even when the light beams are changed, the distance from the objective lens to the focal point of the light beam is supposed to be unchanged. If this distance varied, however, the jump directions (including the accelerating pulse direction and the decelerating pulse direction) sometimes should be changed according to the relation between the variation in focal length and the distance from the first information layer 21 to the second information layer 22. In that case (i.e., if the jump direction should be reversed), the S-curve of the focus error signal would have its polarity inverted. That is to say, sometimes just by changing the light beams, the focus position could pass the second information layer 22 and go farther than that in the positive direction. In that case, unless the objective lens was moved away from the optical disc 20 (i.e., in the negative direction), sometimes no focal point could be located on the second information layer 22. Then, the focus position would move from a deeper level of the optical disc toward a shallower level thereof. As a result, the polarity of the S-curve S2 of the focus error signal shown in portion (a) of FIG. 2 is inverted.

As described above, according to this preferred embodiment, light beams can be changed and a focus jump can be made with the focus control put on hold (i.e., without retracting the objective lens to its rest position). As a result, a read operation can be performed continuously between multiple different information layers of a hybrid disc and the user has to wait a much shorter time even when the light beams are changed.

The optical disc drive of this preferred embodiment can achieve significant effects not only in making a focus jump between multiple different information layers but also in reading/writing data from/on the same information layer. Hereinafter, a method of moving to another location on the same information layer, from/on which data is being read or written, with the light sources (or wavelengths) of the light beam changed will be described.

An optical disc drive, compatible with CDs, DVDS, HD-DVDs and various other optical discs compliant with multiple standards, usually recognizes the type of a given optical disc and changes the light sources into the best one based on the information obtained by searching the optical disc for an information layer with a predetermined light source (including the intensity of the reflected light and the amplitude of an S-curve of a focus error signal) and on the information obtained while the focus control is ON (including the intensity of the reflected light, the amplitude of a TE signal and the contents of the information stored in the information area of the disc). To make this disc type recognition, the prior art needs operations including turning the focus control OFF once, changing the light sources of the light beam into the best one, and then turning the focus control ON all over again. As used herein, the "operations" do not refer to simply "turning the focus control ON from the OFF state" but to a series of operations including retracting the objective lens to its rest position and then performing a focus search (or focus finding) operation while moving the objective lens toward the optical disc. It would take a time of approximately 200 ms to 2 s to get this series of operations done in the prior art. On the other hand, according to this preferred embodiment, the light sources of the light beam are changed without turning the focus control OFF (but with the focus control put on hold and without retracting the objective lens to its rest position). As a result, the amount of time it will take to resume reading or writing data after the light sources have been changed can be shortened to approximately 1 ms or less.

Hereinafter, a preferred embodiment of such a method for changing the light sources for the same information layer without retracting the objective lens will be described with reference to FIG. 3, which is a timing diagram showing the timings to change the wavelengths according to this preferred embodiment.

In the following example, the first light source 3 is supposed to emit a blue violet light beam, the second light source 4 is supposed to emit a red light beam, and the light sources are supposed to be changed from the first light source 3 into the second light source 4 for convenience sake. Such a change needs to be made in a situation where even though the type of the given optical disc is recognized with the first light source 3 with the target information layer expected to be an HD-DVD layer, the information layer on which the focal point of the light beam is located during the disc type recognition actually turns out to be a one to be irradiated with a light beam emitted from the second light source 4 (e.g., a DVD layer).

Figure 1:
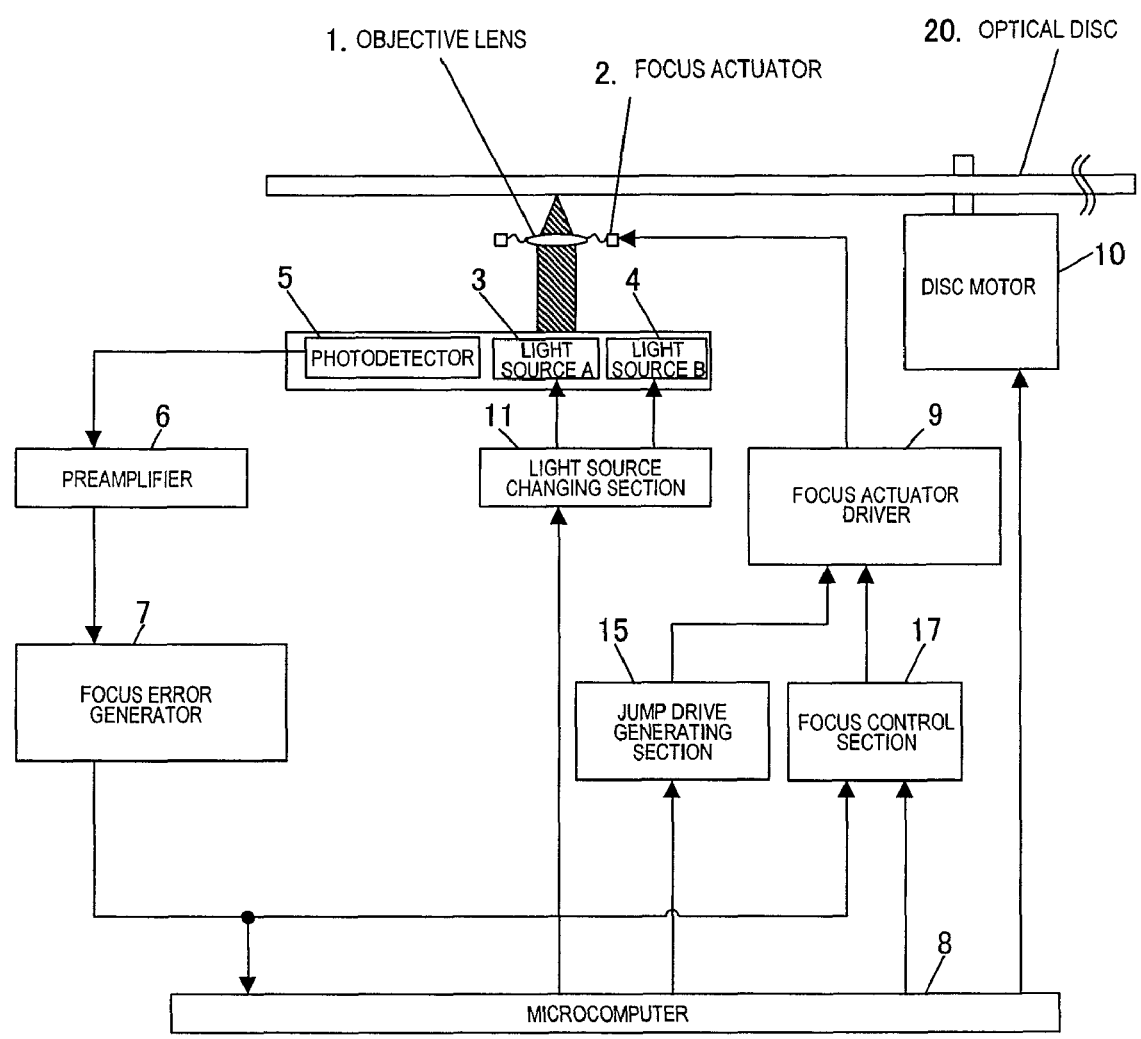
FIG. 1 is a block diagram illustrating an optical disc drive as a first preferred embodiment of the present invention.
Figure 3:
FIG. 3 shows wavelength change timing diagrams according to the first preferred embodiment, wherein portion (a) shows the waveform of a focus error signal, portion (b) shows the waveform of a focus drive signal, portion (c) shows the timings to turn ON and OFF a focus control, portion (d) shows the timings to turn ON and OFF light source A, and portion (e) shows the timings to turn ON and OFF light source B.
Figure 3:
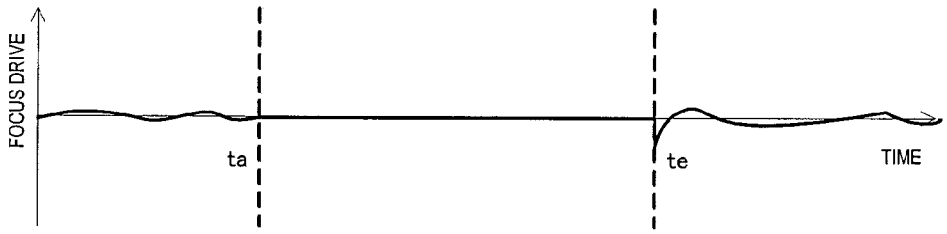
Figure 3:
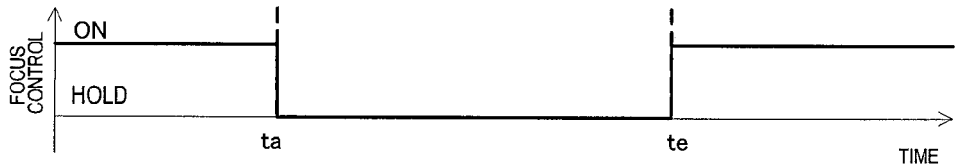
Figure 3:
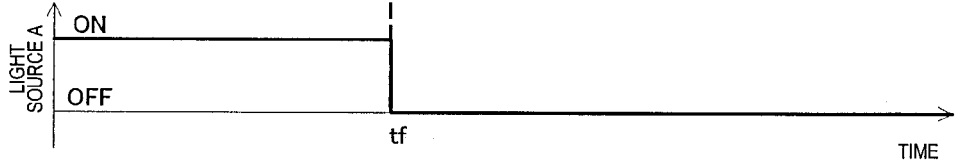
Figure 3:
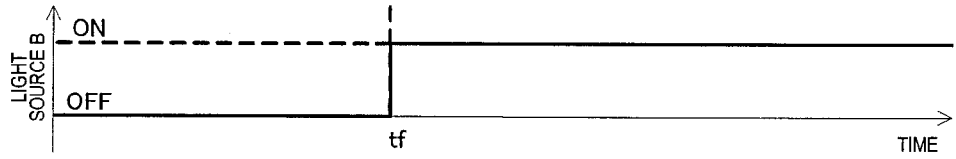

In that case, first, the microcomputer 8 puts the focus control on hold (i.e., puts the output of the focus control section 17 shown in FIG. 1 on hold) at a time ta as shown in portion (c) of FIG. 3. As a result, the axial position of the objective lens 1 is fixed. After that, the focus error signal ideally maintains zero level. Actually, however, as the gap between the optical disc and the objective lens 1 slightly varies, the focus error signal will gradually shift from the zero level as shown in portion (a) of FIG. 3. The focus drive signal output from the jump drive generating section 15 includes no accelerating pulses or decelerating pulses as shown in portion (b) of FIG. 3. Therefore, the objective lens 1 is neither accelerated nor decelerated.

Next, at a time tf, the microcomputer 8 outputs a light beam source change instruction to the light source changing section 11 shown in FIG. 1 as shown in portions (d) and (e) of FIG. 3. In accordance with the instruction given by the microcomputer 8, the light source changing section 11 turns OFF the first light source 3 that emits a blue violet light beam as shown in portion (d) of FIG. 3 and turns ON the second light source 4 that emits a red light beam as shown in portion (e) of FIG. 3. The time tf to change the light sources does not have to be posterior to the time ta but may also be simultaneous with the time ta.

At a time te, when a predetermined amount of time passes after the light sources have been changed and when the emission state of the newly selected light source is stabilized, the microcomputer 8 turns the focus control ON again to finish changing the light sources for the same information layer as shown in portion (c) of FIG. 3. By resuming the focus control, a focus drive is carried out to bring the focus error signal as close to zero level as possible and the focal point of the light beam emitted from the newly selected light source is located right on the target information layer.

If the distance from the objective lens 1 to the focus position of the light beam varies by changing the light sources, an accelerating or decelerating pulse may be output when the light sources are changed.

In the examples described above, the wavelengths of a light beam are changed by changing multiple light sources. If a single light source can emit multiple light beams with mutually different wavelengths, however, the light beams may be changed using such a light source.

According to this preferred embodiment, even if the light sources need to be changed after the type of a given optical disc has been recognized, the time it would take to get the objective lens retracting and focus search operations done can be saved and the user's requested data can start to be read or written quickly.

EMBODIMENT 2

Hereinafter, a second preferred embodiment of an optical disc drive according to the present invention will be described with reference to FIG. 4, which is a block diagram illustrating an optical disc drive as the second preferred embodiment of the present invention.

The optical disc drive of this preferred embodiment is quite different from the counterpart shown in FIG. 1 in that the drive of this preferred embodiment includes an NA changer 12 and an NA changing section 13 to be compatible with optical discs with the structure shown in Table 2. The NA changer 12 can change the numerical apertures (NAs) of the light beam and the NA changing section 13 drives the NA changer 12. As the NA changer 12, an element such as a liquid crystal shutter for changing the sizes of a beam cross section of a light beam may be used.

Hereinafter, it will be described how to perform a focus control according to this preferred embodiment.

The light beam emitted from the first light source 3 is transformed by the NA changer 12 such that the output of the objective lens 1 will have a desired NA and then converged by the objective lens 1, thereby forming a light beam spot on the information layer of the optical disc 20. The light beam that has formed the spot is reflected from the optical disc 20, transmitted through the objective lens 1 and the NA changer 12 again, and then received at the photodetector 5.

In the following example, the optical disc 20 is supposed to be a hybrid disc including a layer C (which is a BD layer that requires a wavelength of 405 nm and an NA of 0.85) as the first information layer 21 and the layer B (which is an HD-DVD layer that requires a wavelength of 405 nm and an NA of 0.65) as the second information layer 22 as shown in Table 2. In this case, the layer C corresponds to the first information layer 21 and the layer B corresponds to the second information layer 22.

To start a read/write operation on the first information layer 21 while a read/write operation is being performed on the second information layer 22, first, the microcomputer 8 puts a focus control on the second information layer 22 on hold. That is to say, the microcomputer 8 outputs a hold instruction to the focus control section 17.

As soon as the focus control section 17 puts the output to the focus actuator driver 9 on hold, the microcomputer 8 outputs an NA change signal to the NA changing section 13 and also outputs a focus jump instruction to the jump direction and distance calculating section 31.

In accordance with the instruction given by the microcomputer 8, the NA changing section 13 drives the NA changer 12, thereby changing the NAs from approximately 0.65 into approximately 0.85.

The jump direction and distance calculating section 31 determines the direction and distance to go for the objective lens 1 in order to move the light beam spot between the first and second information layers 21 and 22. As will be described in detail later, when the NAs are changed, the focal lengths of the objective lens also change. For that reason, the direction and distance to go for the objective lens 1 need to be determined with not only the positional relation between the destination and current information layers but also a variation in focal length into consideration.

The jump direction and distance calculating section 31 determines where and how far the objective lens 1 should go and then outputs a focus jump instruction to the jump drive generating section 15. In accordance with the instruction given by the jump direction and distance calculating section 31, the jump drive generating section 15 outputs a accelerating pulse to the focus actuator driver 9 such that the light beam spot moves from the second information layer 22 to the first information layer 21.

When the focus error signal reaches a predetermined level, the microcomputer 8 outputs a decelerate instruction to the jump drive generating section 15. In accordance with the instruction given by the microcomputer 8, the jump drive generating section 15 outputs a decelerating pulse to the focus actuator driver 9.

On sensing, based on the focus error signal, the focal point of a light beam requiring an NA of approximately 0.85 be located right on the first information layer 21 (i.e., when finding the focus error signal equal to zero), the microcomputer 8 outputs a hold OFF instruction to the focus control section 17. In accordance with the instruction given by the microcomputer 8, the focus control section 17 releases hold on the output and resumes a focus control.

In this manner, a focus jump is complete. After that, a feedback control will be carried out such that the deviation (or error) between the focal point of the light beam requiring an NA of approximately 0.85 and the first information layer 21 becomes equal to zero.

If the NAs need to be changed to make a focus jump, then the focus control is turned OFF temporarily and the objective lens 1 is retracted to its rest position once according to the conventional technique. After that, the NAs are changed for the light beam, the target layer is searched for, and then the focus control is resumed. That is why according to the conventional technique, it would take a time of approximately 200 ms to 2 s to resume the focus control on the target information layer. On the other hand, according to this preferred embodiment, it would take just about 0.2 to 2 ms to get the focus jump done.

Hereinafter, it will be described in detail with reference to FIGS. 5 and 6 exactly how to make a focus jump (on an optical disc with the structure shown in Table 2) according to this preferred embodiment. Portions (a) through (c) of FIG. 5 schematically show the S-curves of a focus error signal associated with multiple NAs for a dual-layer optical disc.

Figure 5:
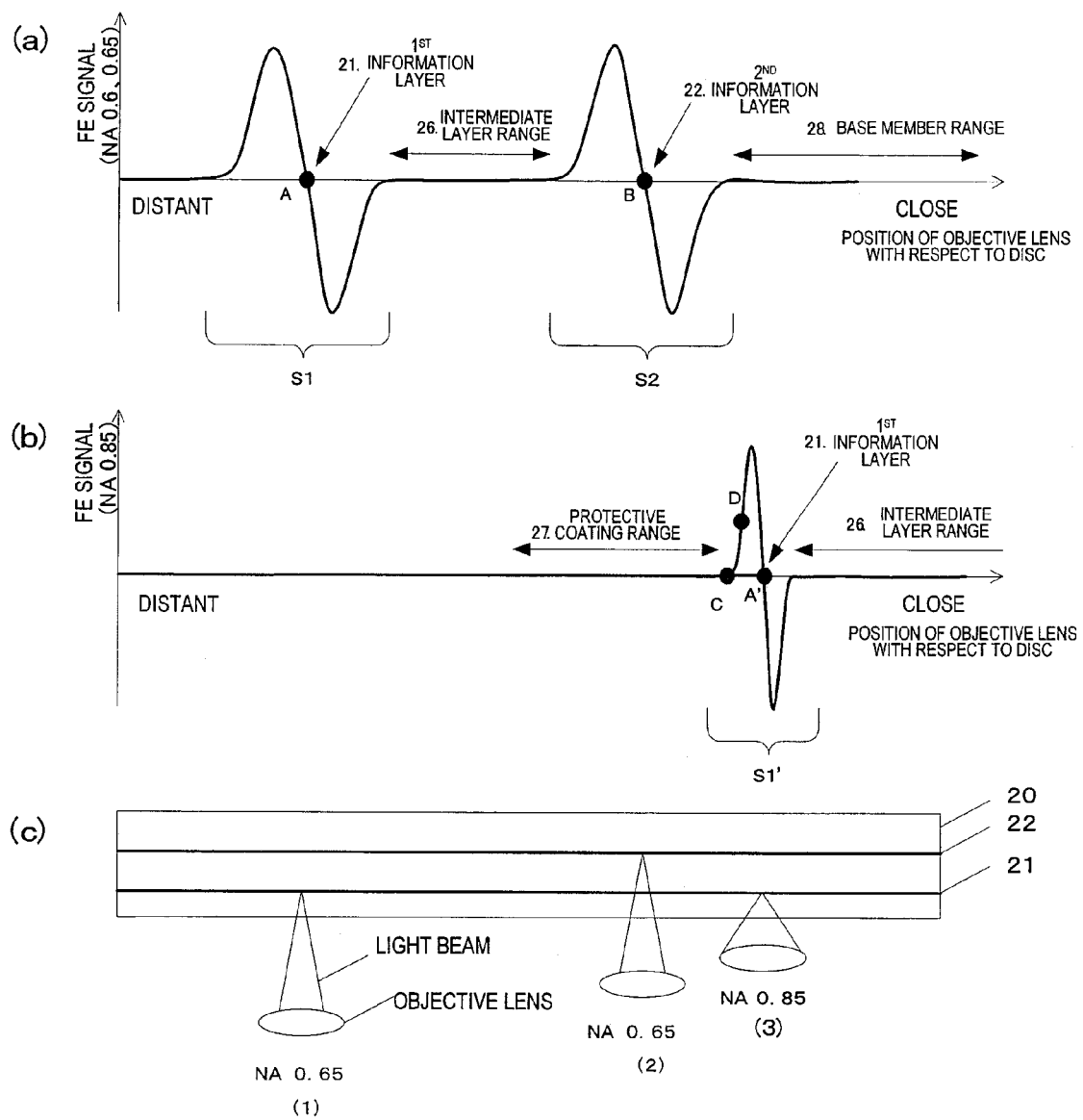
FIG. 5(a) shows focus error S-curves produced from a dual-layer optical disc at an NA of 0.65.
FIG. 5(b) shows a focus error S-curve produced from a dual-layer optical disc at an NA of 0.85, and FIG. 5(c) schematically illustrates relations between objective lenses with different NAs and the dual-layer optical disc.

In an optical system with an NA of 0.65, as the objective lens 1 is moved toward a dual-layer optical disc 20 (having the same structure as the optical disc 25 shown in FIG. 11), two S-curves S1 and S2 will be generated in the focus error signal as shown in portion (a) of FIG. 5 if the focus control is OFF. The points A and B shown in portion (a) of FIG. 5 correspond to the in-focus positions on the first and second information layers 21 and 22, respectively. On the other hand, in an optical system with an NA of 0.85, a single S-curve S1' will be generated on the focus error signal as shown in portion (b) of FIG. 5. It should be noted that the point A' shown in portion (b) of FIG. 5 is not located deeper than the second information layer 22 but is the in-focus position for the first information layer 21. Portion (b) of FIG. 5 shows only the S-curve S1' generated from the first information layer 21 that is located closer to the light-incoming side of the optical disc 20. No S-curve generated from the second information layer 22 is shown in portion (b) of FIG. 5 because an optical system with an NA of 0.85 has a shorter focal length than an optical system with an NA of 0.65 and the focal point of the light beam may sometimes fail to reach the second information layer 22.

In the state (2) shown in portion (c) of FIG. 5, when a read operation is performed on the second information layer 22 using an optical system with an NA of 0.65, the focal point is located at the point B of the S-curve S2 shown in portion (a) of FIG. 5. In such a state, a focus jump is made from the second information layer 22 to the first information layer 21 and the NAs are changed.

In this preferred embodiment, when the NAs are changed from 0.65 into 0.85, the objective lens 1 comes to have a shorter focal length. The variation (i.e., decrease in this case) in focal length is greater than the layer-to-layer distance of approximately 0.5 mm from the second information layer 22 to the first information layer 21. Portion (a) of FIG. 18 illustrates a situation where the light beam is focused on the second information layer 22 at an NA of 0.65, while portion (b) of FIG. 18 illustrates a situation where the NAs have been changed from 0.65 into 0.85. Portion (b) of FIG. 18 shows a state where only the NAs have been changed with the objective lens 1 fixed at the same position for the sake of simplicity. If the NA is just increased from 0.65 to 0.85 with the objective lens 1 fixed at the same position in this manner, then the focal point of the light beam will be located shallower than the first information layer 21. To get the focal point of the light beam located on the first information layer 21 in such a situation, the objective lens 1 should be moved toward the optical disc 20 as shown in portion (c) of FIG. 18.

On the other hand, to make a focus jump from the first information layer 21 to the second information layer 22 as shown in portions (a) through (c) of FIG. 19, the objective lens 1 should be moved away from the optical disc 20. This is because the NA decreases from 0.85 into 0.65 and the focal length increases in this preferred embodiment.

On receiving an instruction to move the light beam spot between the first and second information layers 21 and 22, the jump direction and distance calculating section 31 determines whether the NA will increase or decrease. If the NA will increase, the jump direction and distance calculating section 31 determines the jump direction to be such a direction as to move the objective lens 1 toward the optical disc. On the other hand, if the NA will decrease, the jump direction and distance calculating section 31 determines the jump direction to be such a direction as to move the objective lens 1 away from the optical disc.

The jump distance is calculated as the sum of the distance between the information layers 21 and 22 and the variation in focal length caused by the change of NAs. According to the jump distance thus calculated, the times of application of the accelerating and decelerating pulses may be changed. It should be noted that a focus jump could be made without calculating the jump distance. That is why the distance does not have to be calculated.

According to this preferred embodiment, the NAs are changed from 0.65 into 0.85 after the focus control has been put on hold and after the operation of moving the objective lens 1 toward the optical disc 20 has been started. Until the NAs are changed, the right half of the S-curve S2 of the focus error signal shown in portion (a) of FIG. 5, which is on the right-hand side of the point B (corresponding to the second information layer 22), is detected as the objective lens 1 is moved. If the NAs are changed from 0.65 into 0.85 either during or after the S-curve S2, then the focal point of the light beam will be closer to the objective lens 1 rather than the first information layer 21. That is why if the objective lens 1 is further moved toward the optical disc 20, the focal point will soon reach a position corresponding to the point C shown in portion (b) of FIG. 5. And if the focal point is moved from the position corresponding to the point C to another position corresponding to the point A', the S-curve S1' will be observed in the focus error signal.

It is difficult to control the movement of the objective lens 1 such that the objective lens 1 stops at the in-focus position A' of the S-curve S1' produced from the first information layer 21 by making the focus actuator 2 put brake on the objective lens 1 when the focal point of the objective lens 1 reaches the position corresponding to the point C. This is because in the base member range 28 and the protective coating range 27 shown in portions (a) through (c) of FIG. 5, the peak value of the S-curve may actually include at most approximately 10% of noise components. For that reason, when a focus jump is made from the second information layer 22 to the first information layer 21, it is not clear exactly when to put brake on the objective lens 1 and it is difficult to stop the objective lens 1 at the in-focus position A'.

Thus, according to this preferred embodiment, the objective lens 1 is braked when located at a position corresponding to the point D between the points C and A' of the S-curve S1', thereby turning the focus control ON. Alternatively, the brake may be put on at a point between the point D and the peak value of the S-curve S1'. Still alternatively, the brake may be applied at the point D and kept on until the objective lens 1 reaches a position corresponding to a predetermined point between the peak value of the S-curve S1' and the point A'.

Hereinafter, it will be described more fully with reference to FIG. 6 how to make a focus jump according to this preferred embodiment.

First, suppose a focus control is being carried out such that the focal point is located at the in-focus position of the second information layer 22 (corresponding to the point B shown in FIG. 5). In that case, the focus error signal continues to be approximately equal to zero as in the period preceding a time ta as shown in portion (a) of FIG. 6. In that period, the NA is 0.65.

Figure 6:
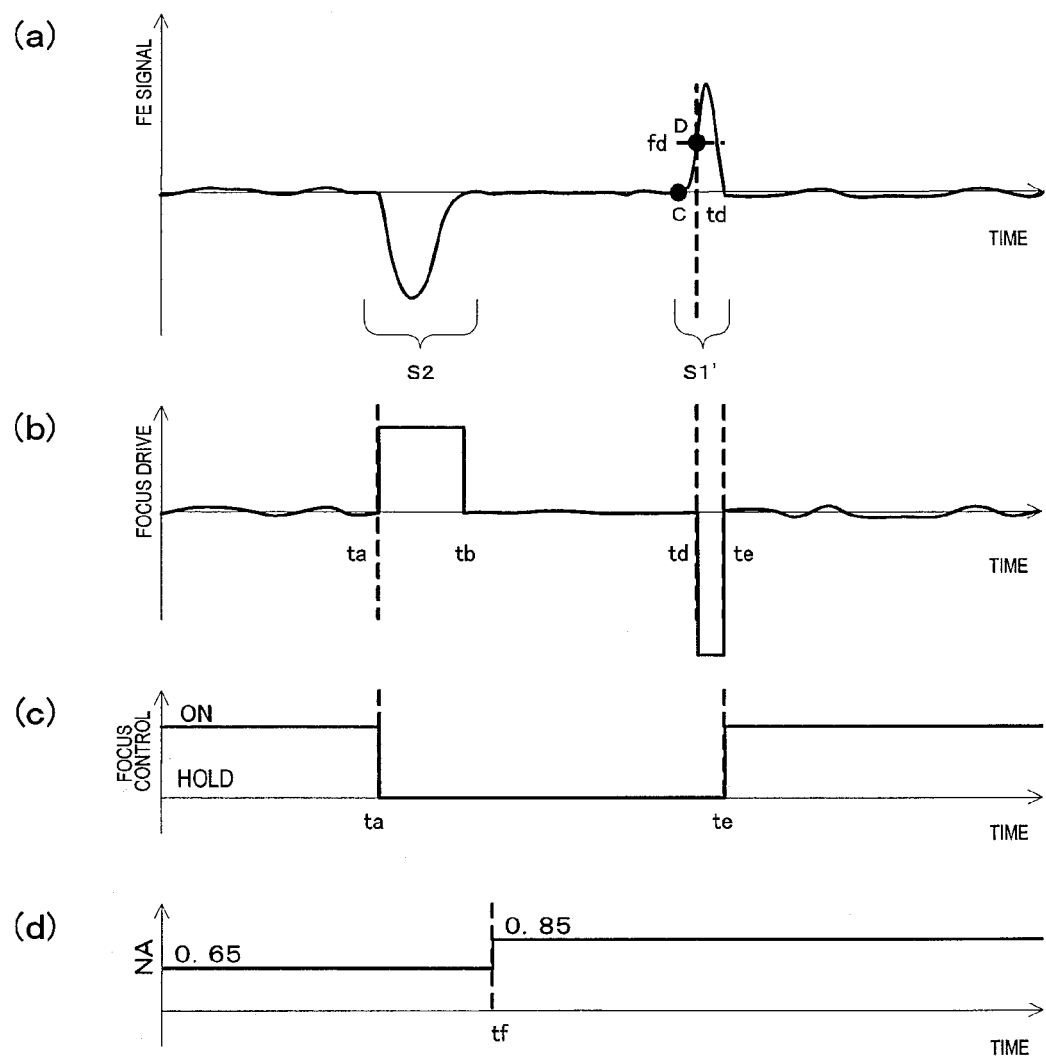
FIG. 6 shows NA change timing diagrams according to the second preferred embodiment, wherein portion (a) shows the waveform of a focus error signal during a focus jump operation, portion (b) shows the waveform of a focus drive signal during the focus jump operation, portion (c) shows the timings to turn ON and OFF a focus control during the focus jump operation, and portion (d) shows the timings to change NAs for the light beam during the focus jump operation.

At that time ta, the microcomputer 8 turns the focus control section 17 OFF and puts its output on hold as shown in portion (c) of FIG. 6. Meanwhile, the microcomputer 8 outputs a focus jump instruction to the jump direction and distance calculating section 31. In response, the jump direction and distance calculating section 31 determines the direction and distance of the jump to be made, thereby controlling the operation of the jump drive generating section 15. In accordance with the instruction given by the jump direction and distance calculating section 31, in the period between the times ta and tb, the jump drive generating section 15 outputs an accelerating pulse to the focus actuator driver 9 as shown in portion (b) of FIG. 6. As a result, the objective lens 1 starts to be moved toward the optical disc 20 by the focus actuator driver 9 and the focus actuator 2.

Next, to change the NAs from 0.65 into 0.85, the microcomputer 8 outputs a light beam NA change instruction to the NA changing section 13 at a time tf as shown in portion (d) of FIG. 6. In accordance with the instruction given by the microcomputer 8, the NA changing section 13 drives the NA changer 12, thereby changing the NAs from approximately 0.65 into approximately 0.85.

As the objective lens 1 is moved, the focal point of the light beam passes a position corresponding to the point C shown in portion (a) of FIG. 6. And when the focus error signal reaches a level fd (corresponding to the point D) at a time td, the jump drive generating section 15 outputs a decelerating pulse to the focus actuator driver 9 in accordance with the instruction given by the microcomputer 8 as shown in portion (b) of FIG. 6. As a result, the objective lens 1 is gradually decelerated and the jump drive generating section 15 stops outputting the decelerating pulse at a time te. At the same time, the microcomputer 8 turns the focus control section 17 ON again to finish the focus jump operation as shown in portion (c) of FIG. 6.

In the example described above, the focus jump is supposed to be made from the second information layer 22 to the first information layer 21. However, the focus jump may also be made from the first information layer 21 to the second information layer 22. In that case, if the objective lens 1 is moved away from the optical disc 20, then an accelerating pulse and a decelerating pulse, of which the polarities are inverse of those of the signal waveform shown in portion (b) of FIG. 6, may be applied in this order. Then, the objective lens 1 will be accelerated so as to go away from the optical disc 20 but will soon be decelerated and stopped.

Optionally, to control the timing to apply the brake, a reference level may be set at a predetermined percentage of the peak-to-peak value of the S-curve and the brake may be applied at that reference level.

It should be noted that the time tf to change the NAs for the light beam does not have to be within the interval between the trailing edge of the accelerating pulse (corresponding to the time tb) and leading edge of the decelerating pulse (corresponding to the time td). Instead, the time tf may also be set while the accelerating pulse is being output (i.e., between the times ta and tb).

The NAs selected by the NA changer 12 do not have to be the exemplary values described above and the structure of the dual-layer optical disc 20 is not limited to the example described above, either.

If the distance from the objective lens 1 to the focal point of the light beam varies when the NAs are changed, the jump directions (i.e., the directions of the accelerating and decelerating pulses) and the polarity of the S-curve of the focus error signal may invert according to the relation between the variation and the distance from the first information layer 21 to the second information layer 22.

In the example described above, a focus jump is supposed to be made from an information layer, on which a read operation is currently performed, to another information layer. However, the beam spot of the light beam may also be shifted within the same information layer, on which a read/write operation is currently performed, by changing the NAs. As described above, after the type of the given optical disc has been recognized, sometimes the NAs for the light beam need to be changed from the one during the type recognition operation into a different one. Hereinafter, a method for shifting the beam spot of a light beam within the same information layer, on which a read/write operation is currently performed, with the NAs changed for the light beam will be described.

Hereinafter, a preferred embodiment of a method for changing NAs for a light beam on the same information layer will be described with reference to FIG. 7, which is a timing diagram showing how the optical disc drive of this preferred embodiment changes the NAs.

To change the NAs, the distance from the objective lens to the optical disc usually needs to be changed as in the states (1) and (3) shown in portion (c) of FIG. 5. For that reason, to perform a read/write operation on the first information layer before and after the NAs are changed, the objective lens needs to be moved from a position corresponding to the point A of the S-curve S1 shown in portion (a) of FIG. 7 to the point A' of the S-curve S1' shown in portion (b) of FIG. 7.

Figure 7:
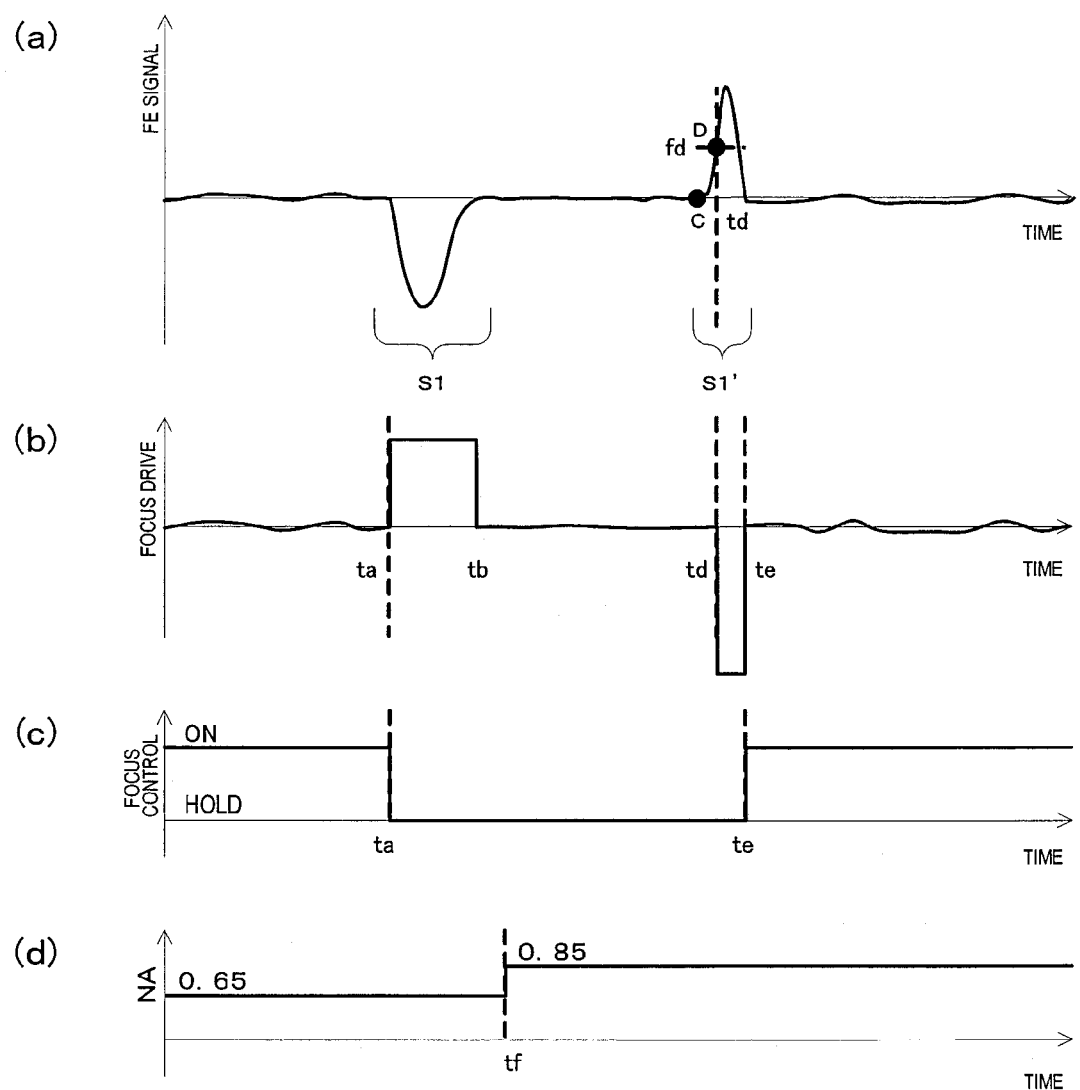
FIG. 7 shows NA change timing diagrams according to the second preferred embodiment, wherein portion (a) shows the waveform of a focus error signal, portion (b) shows the waveform of a focus drive signal, portion (c) shows the timings to turn ON and OFF a focus control, and portion (d) shows the timings to change NAs for the light beam.

First, as shown in portion (c) of FIG. 7, the microcomputer 8 turns the focus control section 17 OFF and puts its output on hold at the time ta. At the same time, the microcomputer 8 outputs a jump start instruction to the jump direction and distance calculating section 31. In response, the jump direction and distance calculating section 31 determines the direction and distance to go for the objective lens 1, which will be required when the NAs are changed, thereby controlling the operation of the jump drive generating section 15. If the NA needs to be increased from 0.65 to 0.85, the jump direction and distance calculating section 31 instructs the jump drive generating section 15 to move the objective lens 1 toward the optical disc 20. In accordance with this instruction, the jump drive generating section 15 outputs an accelerating pulse to the focus actuator driver 9 from the time ta through the time tb as shown in portion (b) of FIG. 7. As a result, the objective lens 1 starts to be moved toward the optical disc by the focus actuator driver 9 and the focus actuator 2.

Next, as shown in portion (d) of FIG. 7, the microcomputer 8 outputs a light beam NA change instruction to the NA changing section 13 at a time tf. Following the instruction given by the microcomputer 8, the NA changing section 13 drives the NA changer 12, thereby changing the NAs from approximately 0.65 for the layer B (corresponding to the second information layer 22) into approximately 0.85 for the layer C (corresponding to the first information layer 21) as shown in portion (d) of FIG. 7. It should be noted that the focal point is shifted from the first information layer 21 (with the S-curve S1) to the same information layer 21 (with the S-curve S1'), not from the second information layer 22 (with the S-curve S2) to the first information layer 21. As the objective lens 1 is moved, the focal point of the light beam passes a position corresponding to the point C shown in portion (a) of FIG. 7. And when the focus error signal reaches a level fd (corresponding to the point D) at a time td, the jump drive generating section 15 outputs a decelerating pulse to the focus actuator driver 9 in accordance with the instruction given by the microcomputer 8 as shown in portion (b) of FIG. 7.

As a result, the objective lens 1 is gradually decelerated and the jump drive generating section 15 stops outputting the decelerating pulse at a time te. At the same time, the microcomputer 8 turns the focus control section 17 ON again to finish the focus jump operation as shown in portion (c) of FIG. 7.

In the example described above, a focus jump is supposed to be made in a situation where the NAs need to be changed from 0.65 into 0.85. However, the NAs may also be changed the other way from 0.85 into 0.65. In that case, the polarity of the accelerating pulse will be negative as opposed to that of the positive accelerating pulse shown in portion (b) of FIG. 6. As a result, the objective lens 1 is accelerated away from the optical disc and starts to move.

And when a positive decelerating pulse, of which the polarity is opposite to that of the negative decelerating pulse shown in portion (b) of FIG. 6, is applied, the objective lens 1 is decelerated and stopped soon.

The time tf to change the NAs may be either a while after, or simultaneous with, the time ta. If the distance from the objective lens 1 to the focus position of the light beam does not vary even when the NAs are changed, then the process of putting the focus control on hold only while the NAs are being changed will be carried out without outputting accelerating or decelerating pulses.

EMBODIMENT 3

Figure 8:
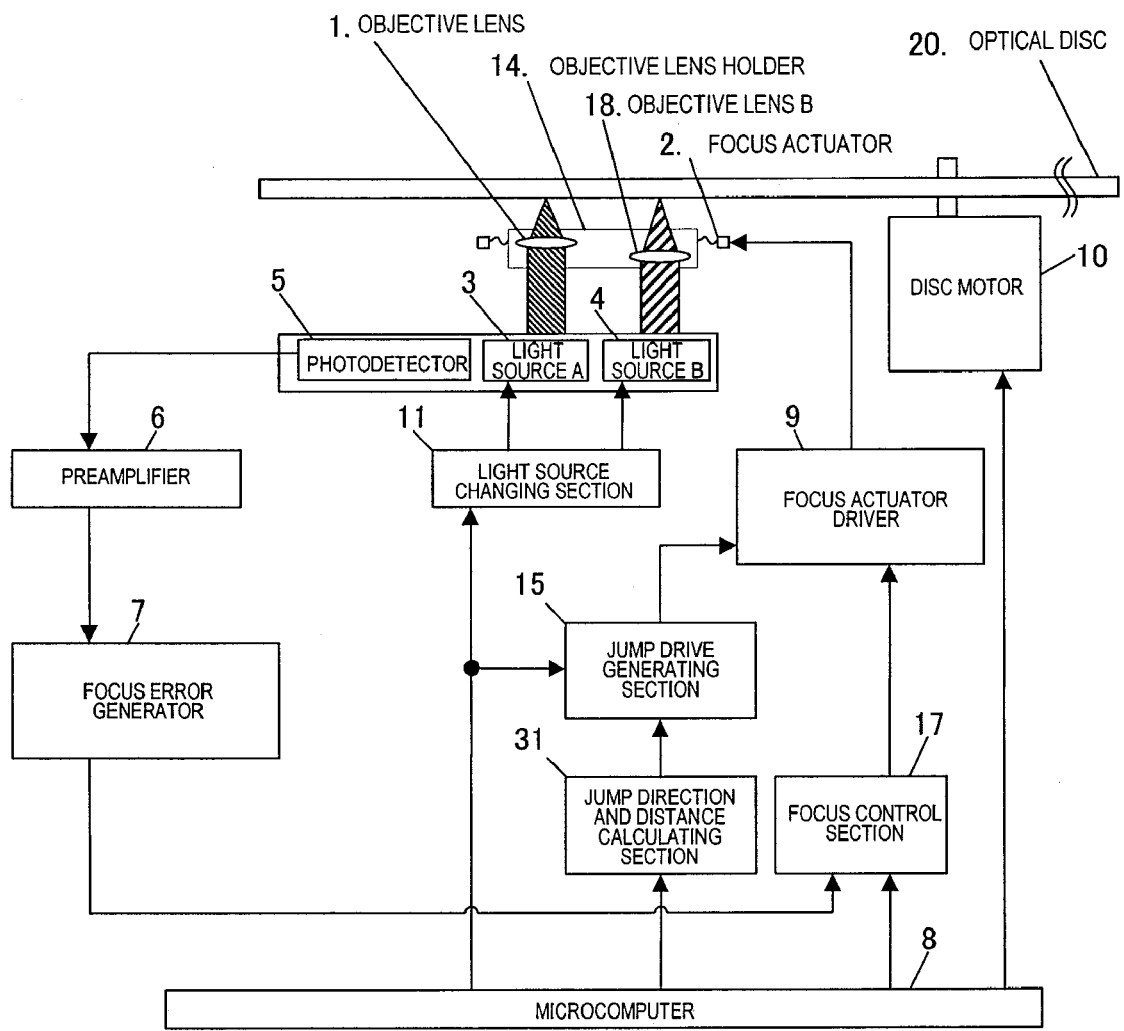
FIG. 8 is a block diagram illustrating an optical disc drive as a third preferred embodiment of the present invention.

Hereinafter, a third preferred embodiment of an optical disc drive according to the present invention will be described. FIG. 8 is a block diagram illustrating an optical disc drive as a third preferred embodiment of the present invention.

Figure 4:
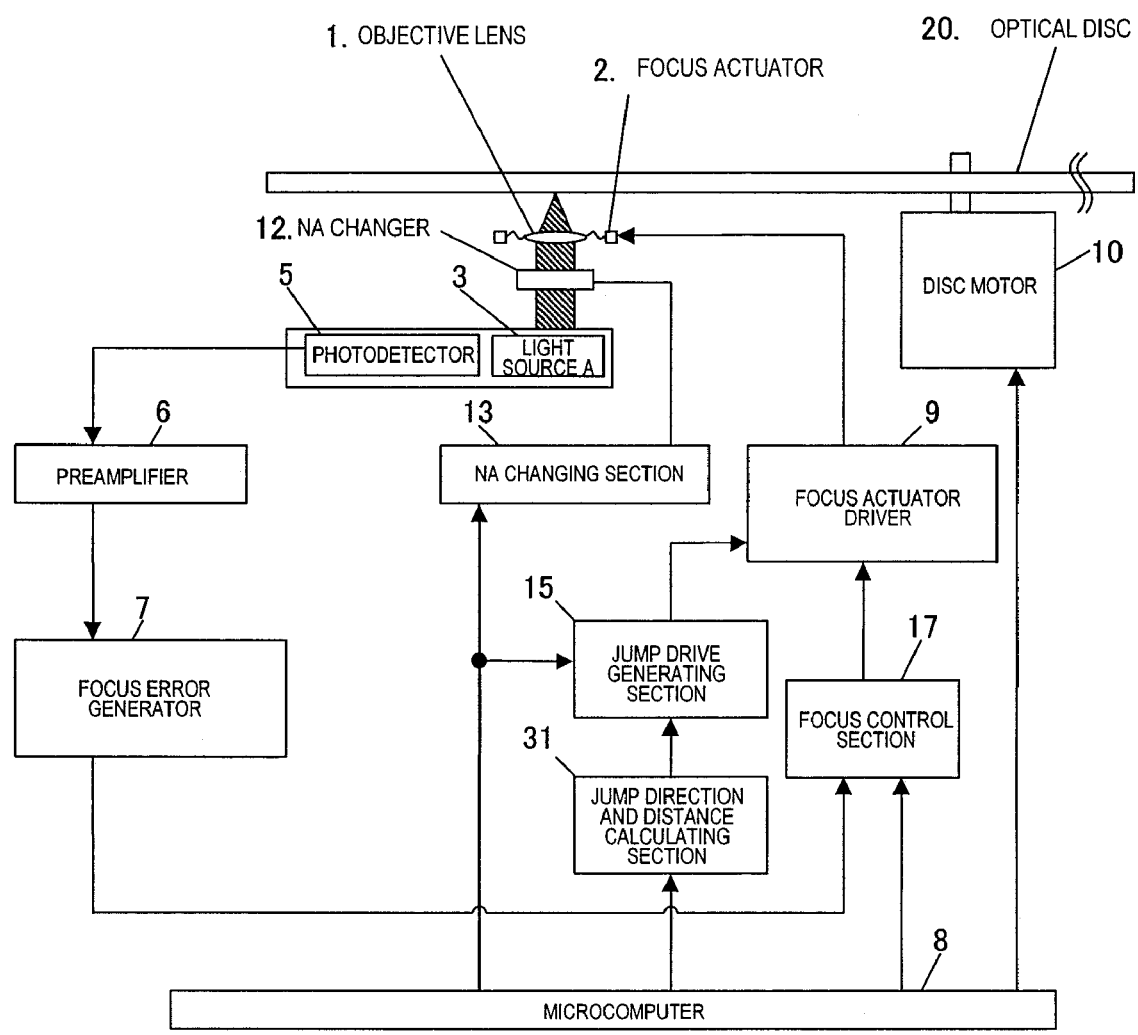
FIG. 4 is a block diagram illustrating a disc drive as a second preferred embodiment of the present invention.

The optical disc drive of this preferred embodiment is quite different from the counterpart shown in FIG. 4 in that this optical disc drive includes a mechanism for changing the optical systems altogether (i.e., both wavelengths and NAs) when the light sources are changed in order to be compatible with an optical disc having the structure shown in Table 3.

The optical disc drive of this preferred embodiment includes a first light source 3 and a second light source 4 with mutually different emission wavelengths. An objective lens holder 14 holds the objective lens 1 and another objective lens 18. In the objective lens holder 14, the objective lens 1 is held closer to the optical disc 20 than the objective lens 18 is. In FIG. 8, the focal points of the objective lenses 1 and 18 are shown as if these focal points were both located at the same distance with respect to the optical disc 20 for the sake of simplicity. Actually, however, the focal point of the objective lens 1 is located under that of the objective lens 18 as shown in portions (a) and (b) of FIG. 20. This is because if the objective lens 1 with a short focal length were arranged too close to the optical disc 20 for its focal length, then the objective lens 1 could collide against the optical disc 20. That is why a sufficient gap should be left to ward off such a collision. To avoid the collision, according to this preferred embodiment, the level difference between the objective lenses 1 and 18 is adjusted to be a relatively small value.

The focus actuator 2 drives the objective lens holder 14 along the optical axis of the light beam (i.e., perpendicularly to the optical disc). The objective lenses 1 and 18 are fixed by the objective lens holder 14. Thus, these objective lenses 1 and 18 are driven along the optical axis of the light beam by the focus actuator 2.

Hereinafter, it will be described how the drive of this preferred embodiment operates.

In this preferred embodiment, a hybrid disc in which a first information layer 21 (which may be a BD layer that requires a wavelength of 405 nm and an NA of 0.85) and a second information layer 22 (which may be a DVD layer that requires a wavelength of 650 nm and an NA of 0.6) are stacked one upon the other as shown in Table 3 is used as the optical disc 20.

A read/write operation on the first information layer 21 is performed using the first light source 3 and the objective lens 1 in combination. On the other hand, a read/write operation on the second information layer 22 is performed using the second light source 4 and the objective lens 18 in combination. In performing a read/write operation on such a hybrid disc, the light beam is converged on either the first information layer 21 or the second information layer 22.

In reading or writing data from/on the second information layer 22, a red light beam emitted from the second light source 4 with a wavelength of approximately 650 nm is converged by the objective lens 18 with no blue violet light beam (with a wavelength of approximately 405 nm) emitted from the first light source 3.

Next, to perform a read/write operation on the first information layer 21, a focus jump needs to be made from the second information layer 22 to the first information layer 21. To make the focus jump, first, the microcomputer 8 shown in FIG. 8 turns OFF the tracking control on the second information layer 22 and outputs a hold instruction to the focus control section 17.

As soon as the focus control section 17 puts the output to the focus actuator driver 9 on hold, the microcomputer 8 outputs a focus jump instruction to the jump direction and distance calculating section 31.

Following the instruction, the jump direction and distance calculating section 31 determines the direction and distance to go for the objective lens 1. This preferred embodiment is different from the other preferred embodiments described above in that two objective lenses 1 and 18, which are located at different distances from the optical disc 20, are supported by the same objective lens holder 14. Hereinafter, this point will be described with reference to FIGS. 20 and 21.

Portions (a) and (b) of FIG. 20 are schematic cross-sectional views showing how to make a focus jump when the NA needs to be increased. In the state shown in portion (a) of FIG. 20, no light beam (with a wavelength of 405 nm) passes through the objective lens 1 with an NA of 0.85 but a light beam (with a wavelength of 650 nm) is converged by the objective lens 18 with an NA of 0.6 on the second information layer (DVD layer) 22. To make a focus jump from this second information layer 22 to the first information layer (BD layer) 21, the NA needs to be increased from 0.6 to 0.85. Portion (b) of FIG. 20 shows a situation after the focus jump has been made. Specifically, a light beam (with a wavelength of 405 nm) is transmitted through the objective lens 1 with an NA of 0.85 and converged on the first information layer (BD layer) 21. In such a state, no light beam (with a wavelength of 650 nm) is transmitted through the objective lens 18 with an NA of 0.6.

Comparing the two situations shown in portions (a) and (b) of FIG. 20 to each other, it can be easily seen that the lens holder 14 needs to be moved toward the optical disc 20 to change from the state shown in portion (a) of FIG. 20 into the one shown in portion (b) of FIG. 20. This is because as shown in portions (a) and (b) of FIG. 20, the focal point of the light beam converged by the objective lens 1 is located at a lower position (i.e., more distance from the optical disc 20) than that of the light beam converged by the objective lens 18.

Portions (a) and (b) of FIG. 21 are schematic cross-sectional views showing how to make a focus jump when the NA needs to be decreased. In the state shown in portion (a) of FIG. 21, no light beam (with a wavelength of 650 nm) passes through the objective lens 18 with an NA of 0.6 but a light beam (with a wavelength of 405 nm) is converged by the objective lens 1 with an NA of 0.85 on the first information layer (BD layer) 21. To make a focus jump from this first information layer 21 to the second information layer (DVD layer) 22, the NA needs to be decreased from 0.85 to 0.6. Portion (b) of FIG. 21 shows a situation after the focus jump has been made. Specifically, a light beam (with a wavelength of 650 nm) is transmitted through the objective lens 18 with an NA of 0.6 and converged on the second information layer (DVD layer) 22. In such a state, no light beam (with a wavelength of 405 nm) is transmitted through the objective lens 1 with an NA of 0.85.

Comparing the two situations shown in portions (a) and (b) of FIG. 21 to each other, it can be easily seen that the lens holder 14 needs to be moved away from the optical disc 20 to change from the state shown in portion (a) of FIG. 21 into the one shown in portion (b) of FIG. 21.

Based on the direction and distance to go to reach the destination information layer and on the variation in focal length due to the change of light sources, the jump direction and distance calculating section 31 controls the operation of the jump drive generating section 15. In this example, the jump direction and distance calculating section 31 instructs the jump drive generating section 15 to move the objective lens 1 toward the optical disc 20. In accordance with this instruction, the jump drive generating section 15 outputs an accelerating pulse to the focus actuator driver 9 from the time ta through the time tb as shown in portion (b) of FIG. 6.

While the light beam spot is moving from the second information layer 22 to the first information layer 21, the microcomputer 8 outputs a light source change signal to the light source changing section 11. Following the instruction given by the microcomputer 8, the light source changing section 11 makes the second light source 4 stop emitting a red light beam and makes the first light source 3 start emitting a blue violet light beam.

After the blue violet light beam has started being emitted, the microcomputer 8 sees, based on the focus error signal that is the output signal of the focus error generator 7, if the focus error signal has reached a predetermined level and then outputs a decelerate instruction to the jump drive generating section 15.

In accordance with the instruction given by the jump direction and distance calculating section 31, the jump drive generating section 15 outputs a decelerating pulse to the focus actuator driver 9. When finding, based on the focus error signal, the focal point of the blue violet light beam located on the first information layer 21 (i.e., when finding the focus error signal equal to zero), the microcomputer 8 outputs a hold OFF instruction to the focus control section 17.

In accordance with the instruction given by the microcomputer 8, the focus control section 17 releases hold on the output and resumes the focus control. In this manner, a focus jump is complete. After that, the error between the focal point of the blue violet light beam and the first information layer 21 will be detected as a focus error signal by the photodetector 5, the preamplifier 6 and the focus error generator 7, and the focus control section 17, the focus actuator driver 9 and the objective lens holder 14 control the position of the objective lens 1 based on the focus error signal. That is to say, a feedback control is carried out such that the error between the focal point of the blue violet light beam and the layer C becomes equal to zero.

Hereinafter, it will be described more fully with reference to FIGS. 5 and 9 how to make a focus jump according to this preferred embodiment. In this preferred embodiment, NA=0.6, which is different from an NA of 0.65 in FIG. 5.

First, suppose a focus control is being carried out such that the focal point is located at the in-focus position of the second information layer 22 (corresponding to the point B shown in FIG. 5). In that case, the focus error signal continues to be approximately equal to zero as in the period preceding a time ta as shown in portion (a) of FIG. 9. In that period, the NA is 0.6.

Figure 9:
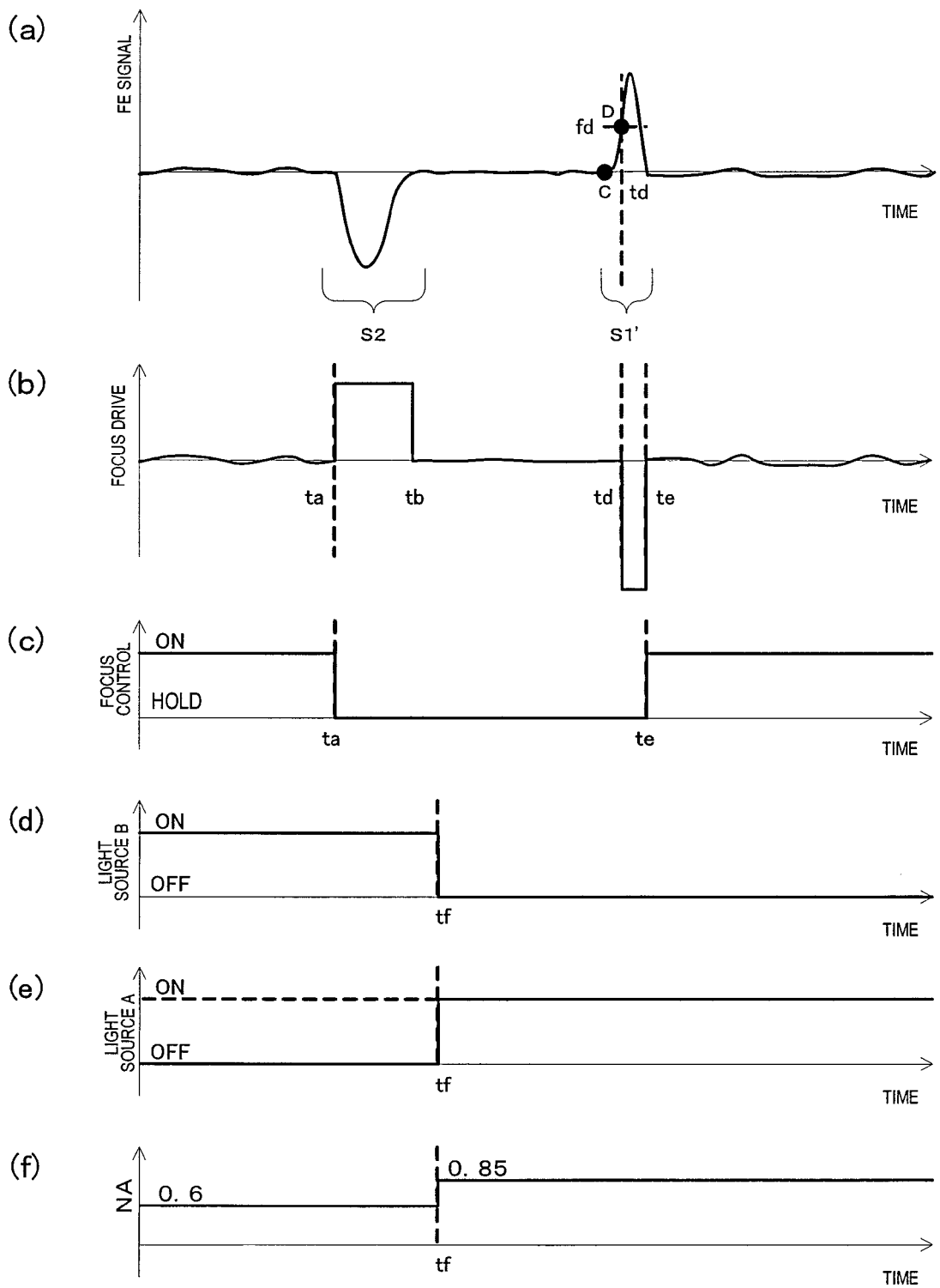
FIG. 9 shows focus jump timing diagrams according to the third preferred embodiment of the present invention, wherein portion (a) shows the waveform of a focus error signal during a focus jump operation, portion (b) shows the waveform of a focus drive signal during the focus jump operation, portion (c) shows the timings to turn ON and OFF a focus control during the focus jump operation, portion (d) shows the timings to turn ON and OFF light source A during the focus jump operation, portion (e) shows the timings to turn ON and OFF light source B during the focus jump operation, and portion (f) shows the timings to change NAs for the light beam during the focus jump operation.

At that time ta, the microcomputer 8 turns the focus control section 17 OFF and puts its output on hold as shown in portion (c) of FIG. 9. Meanwhile, the microcomputer 8 outputs a focus jump instruction to the jump direction and distance calculating section 31. In response, the jump direction and distance calculating section 31 controls the operation of the jump drive generating section 15 as in the other preferred embodiments described above. In this preferred embodiment, the jump direction and distance calculating section 31 instructs the jump drive generating section 15 to move the objective lens 1 toward the optical disc 20. In accordance with this instruction, in the period between the times ta and tb, the jump drive generating section 15 outputs an accelerating pulse to the focus actuator driver 9 as shown in portion (b) of FIG. 9. As a result, the objective lenses 1 and 18 start to be moved toward the optical disc by the focus actuator driver 9 and the focus actuator 2.

Next, the microcomputer 8 outputs a light beam source change instruction to the light source changing section 11 at a time tf as shown in portions (d) and (e) of FIG. 9. In accordance with the instruction given by the microcomputer 8, the light source changing section 11 turns OFF the second light source 4 for the second information layer 22 and simultaneously turns ON the first light source 3 for the first information layer 21. As a result, the objective lenses to use are changed from the objective lens 18 into the objective lens 1 and NAs are also changed from 0.6 into 0.85 as shown in portion (f) of FIG. 9.

As the objective lens 1 is moved, the focal point of the light beam passes a position corresponding to the point C shown in portion (a) of FIG. 9. And when the focus error signal reaches a level fd (corresponding to the point D) at a time td, the jump drive generating section 15 outputs a decelerating pulse to the focus actuator driver 9 in accordance with the instruction given by the microcomputer 8 as shown in portion (b) of FIG. 9. As a result, the objective lens 1 is gradually decelerated and the jump drive generating section 15 stops outputting the decelerating pulse at a time te. At the same time, the microcomputer 8 turns the focus control section 17 ON again to finish the focus jump operation as shown in portion (c) of FIG. 9.

Hereinafter, a preferred embodiment of a method for changing both the light sources and the optical systems on the same information layer will be described with reference to FIG. 10. In the example to be described below, the second light source 4 (that emits a red light beam) is supposed to be changed into the first light source 3 (that emits a blue violet light beam).

Figure 10:
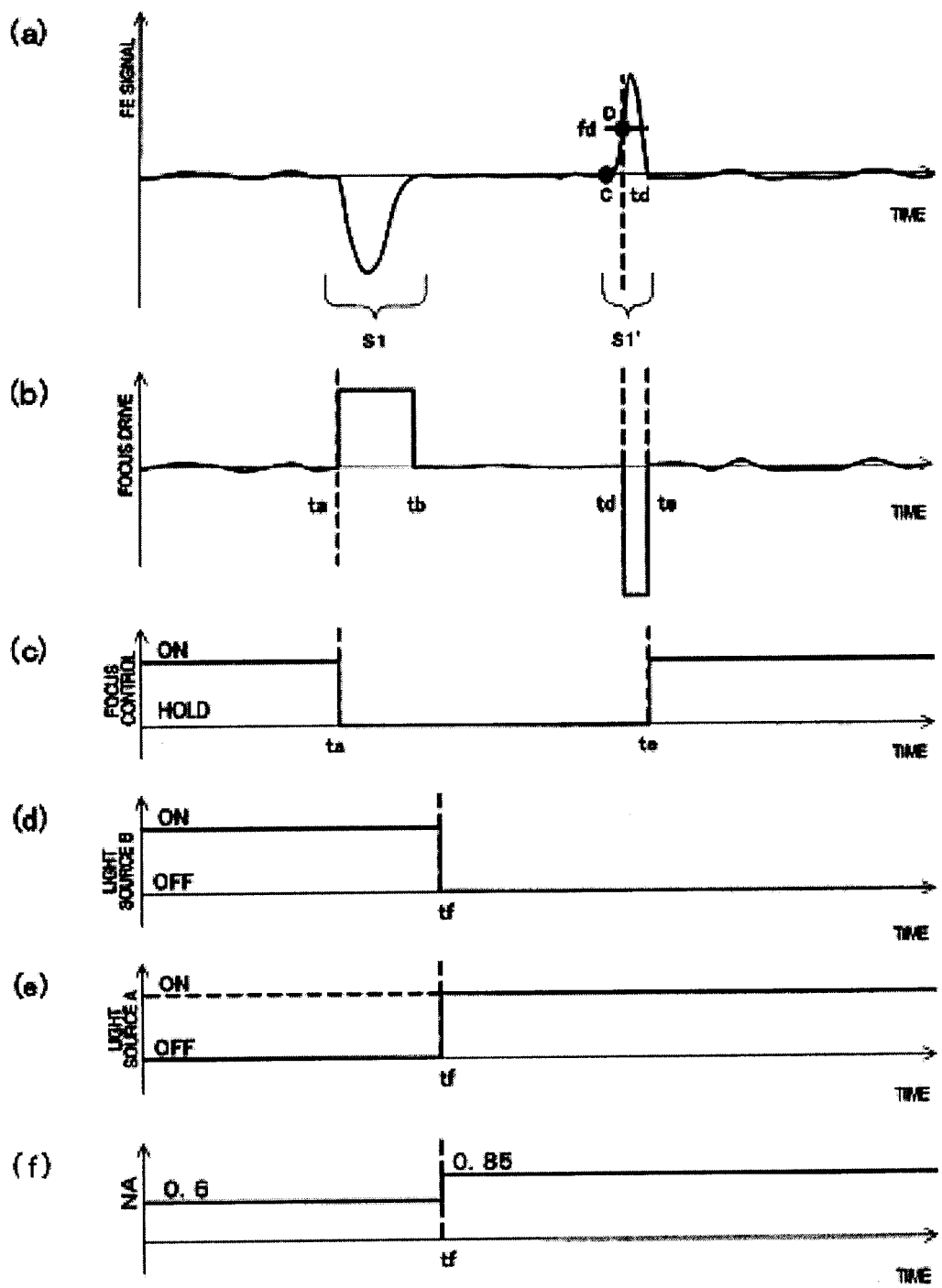
FIG. 10 shows wavelength and NA change timing diagrams according to the third preferred embodiment of the present invention, wherein portion (a) shows the waveform of a focus error signal, portion (b) shows the waveform of a focus drive signal, portion (c) shows the timings to turn ON and OFF a focus control, portion (d) shows the timings to turn ON and OFF light source A, portion (e) shows the timings to turn ON and OFF light source B and portion (f) shows the timings to change NAs for the light beam.

First, at a time ta, the microcomputer 8 turns the focus control section 17 OFF and puts its output on hold as shown in portion (c) of FIG. 10. Meanwhile, the microcomputer 8 outputs a jump start instruction to the jump direction and distance calculating section 31. In response, the jump direction and distance calculating section 31 determines the direction and distance to go for the objective lens 1 as required by the change of NAs. In accordance with the instruction given by the jump direction and distance calculating section 31, in the period between the times ta and tb, the jump drive generating section 15 outputs an accelerating pulse to the focus actuator driver 9 as shown in portion (b) of FIG. 10.

As a result, the objective lenses 1 and 18 start to be moved toward the optical disc by the focus actuator driver 9 and the focus actuator 2.

Next, the microcomputer 8 outputs a light beam source change instruction to the light source changing section 11 at a time tf as shown in portions (d) and (e) of FIG. 10. In accordance with the instruction given by the microcomputer 8, the light source changing section 11 turns OFF the second light source 4 and simultaneously turns ON the first light source 3 as shown in portion (d) of FIG. 10. As a result, the objective lenses to use are changed from the objective lens 18 into the objective lens 1 and NAs are also changed from 0.6 into 0.85 as shown in portion (f) of FIG. 10.

As the objective lens 1 is moved, the focal point of the light beam passes a position corresponding to the point C shown in portion (a) of FIG. 10. And when the focus error signal reaches a level fd (corresponding to the point D) at a time td, the jump drive generating section 15 outputs a decelerating pulse to the focus actuator driver 9 in accordance with the instruction given by the microcomputer 8 as shown in portion (b) of FIG. 10. As a result, the objective lens 1 is gradually decelerated and the jump drive generating section 15 stops outputting the decelerating pulse at a time te.

If the distance between the focal point of the light beam and the objective lens 1 or 18 does not vary even when the wavelengths and NAs are changed, then no accelerating pulses or decelerating pulses will be output and the focus control will be put on hold only while the wavelengths and NAs are being changed.

In the preferred embodiment described above, the NAs are changed by changing the objective lenses to use.

Alternatively, the NAs may also be changed by using the NA changer for a single objective lens.

EMBODIMENT 4

Figure 17:
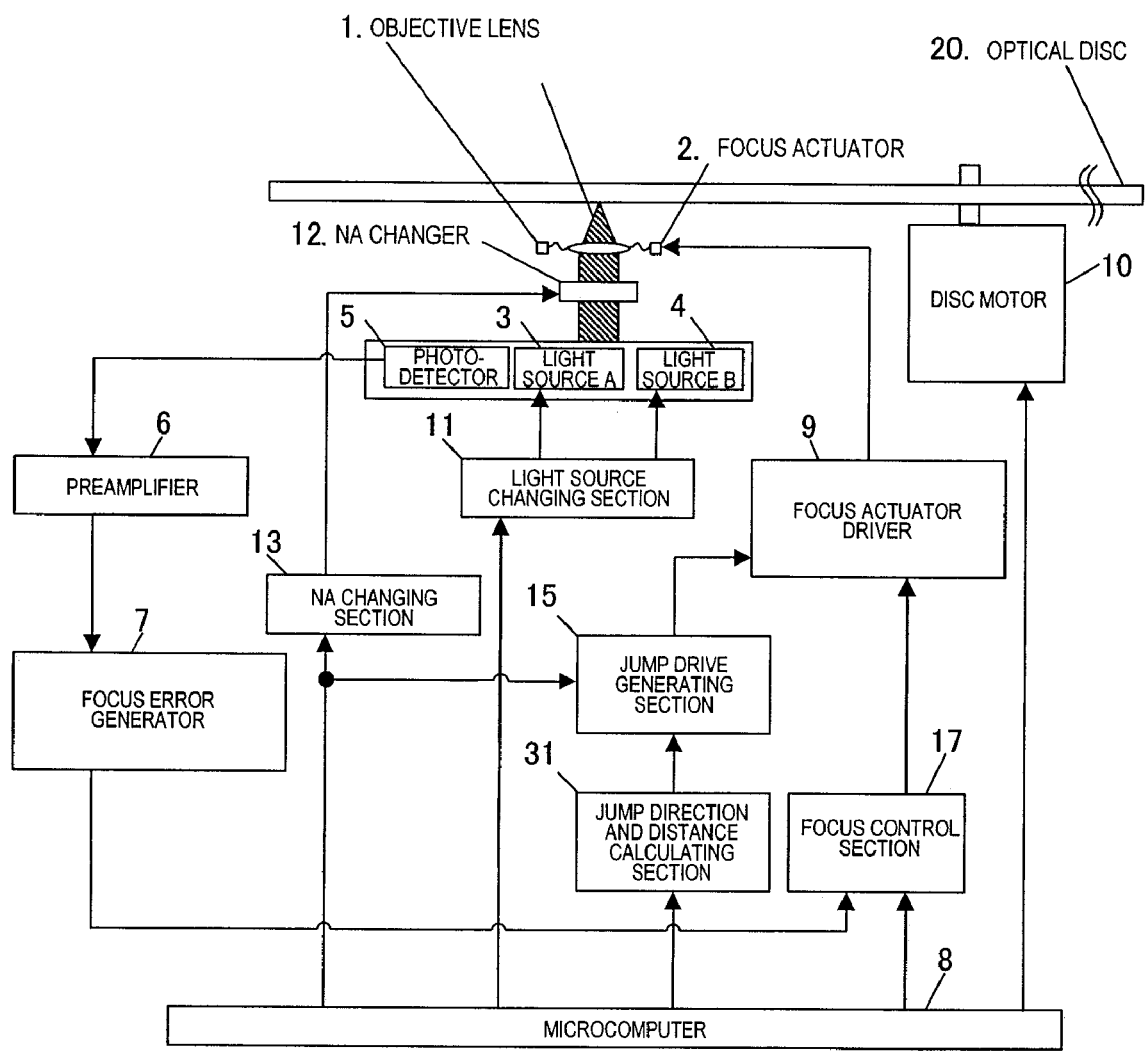
FIG. 17 is a block diagram illustrating an optical disc drive as a fourth preferred embodiment of the present invention.

Hereinafter, a fourth preferred embodiment of an optical disc drive according to the present invention will be described. FIG. 17 is a block diagram illustrating an optical disc drive as a fourth preferred embodiment of the present invention.

The optical disc drive of this preferred embodiment is quite different from the counterpart shown in FIG. 8 in that the same objective lens 1 can deal with the two light sources 3 and 4 with mutually different wavelengths. For that purpose, the optical disc drive of this preferred embodiment includes the first and second light sources 3 and 4 with mutually different emission wavelengths, an NA changer 12 and an NA changing section 13. The NA changer 12 has the same configuration as the counterpart 12 of the second preferred embodiment described above. Thanks to the operation of the NA changing section 13, the NAs (numerical apertures) for the light beam can be changed according to the light source selected.

Figure 14:
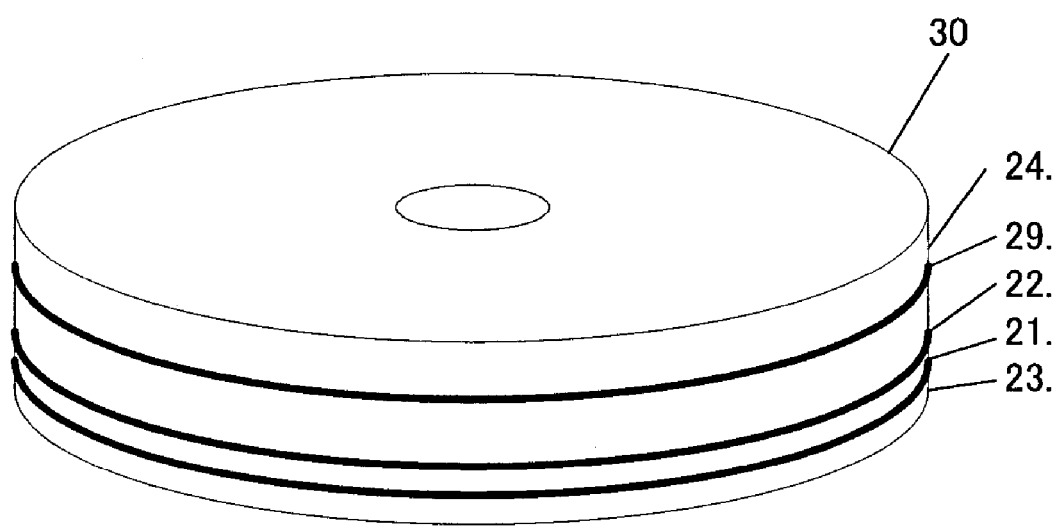
FIG. 14 is a perspective view illustrating an optical disc with a three-layer structure.

The optical disc drive of this preferred embodiment is compatible with any of the hybrid optical discs shown in Tables 1 to 4. In the following example, it will be described how the optical disc drive operates on an optical disc with the structure shown in Table 4. The optical disc for use in this preferred embodiment is an optical disc 30 with the structure shown in FIG. 14. Specifically, the optical disc 30 is a hybrid disc in which a first information layer 21 (that requires a wavelength of 405 nm and an NA of 0.85), a second information layer 22 (that also requires a wavelength of 405 nm and an NA of 0.85) and a third information layer 29 (that requires a wavelength of 650 nm and an NA of 0.6) are stacked one upon the other.

As for this optical disc 30, a read/write operation on the first and second information layers 21 and 22 is performed using the first light source 3 with a wavelength of 405 nm, while a read/write operation on the third information layer 29 is performed using the second light source 4 with a wavelength of 650 nm. The NA changer 12 changes the NAs into 0.85 when the first light source 3 is used and into 0.6 when the second light source 4 is used.

Suppose data is being read from, or written on, the third information layer 29. In that case, a red light beam emitted from the second light source 4 with a wavelength of approximately 650 nm is converged by the objective lens 1 with no blue violet light beam (with a wavelength of approximately 405 nm) emitted from the first light source 3.

Next, suppose a read/write operation needs to be performed on the second information layer 22. In that case, a focus jump needs to be made from the third information layer 29 to the second information layer 22. To make the focus jump, first, the microcomputer 8 shown in FIG. 17 turns OFF the tracking control on the third information layer 29 and outputs a hold instruction to the focus control section 17. Subsequently, as soon as the focus control section 17 puts the output to the focus actuator driver 9 on hold, the microcomputer 8 outputs a focus jump instruction to the jump direction and distance calculating section 31.

The jump direction and distance calculating section 31 determines the direction and distance to go for the objective lens as described above in order to move the light beam spot from the third information layer 29 to the second information layer 22. Based on the direction and distance to go to reach the destination information layer and on the variation in focal length due to the change of light sources, the jump direction and distance calculating section 31 controls the operation of the jump drive generating section 15. In this example, the jump direction and distance calculating section 31 instructs the jump drive generating section 15 to move the objective lens toward the optical disc 30. In accordance with this instruction, the jump drive generating section 15 outputs an accelerating pulse to the focus actuator driver 9 from the time ta through the time tb as shown in portion (b) of FIG. 6.

While the light beam spot is moving from the third information layer 29 to the second information layer 22, the microcomputer 8 outputs a light source change signal to the light source changing section 11 and an NA change signal to the NA changing section 13, respectively.

Following the instruction given by the microcomputer 8, the light source changing section 11 makes the second light source 4 stop emitting a red light beam and makes the first light source 3 start emitting a blue violet light beam instead. Meanwhile, in accordance with the instruction given by the microcomputer 8, the NA changing section 13 drives the NA changer 12, thereby changing the NAs from approximately 0.6 into approximately 0.85.

After the blue violet light beam (associated with a wavelength of 405 nm and an NA of 0.85) has started being emitted, the microcomputer 8 sees, based on the focus error signal that is the output signal of the focus error generator 7, if the focus error signal has reached a predetermined level and then outputs a decelerate instruction to the jump drive generating section 15.

In accordance with the instruction given by the jump direction and distance calculating section 31, the jump drive generating section 15 outputs a decelerating pulse to the focus actuator driver 9. When finding, based on the focus error signal, the focal point of the blue violet light beam located right on the first information layer 21 (i.e., when finding the focus error signal equal to zero), the microcomputer 8 outputs a hold OFF instruction to the focus control section 17.

In accordance with the instruction given by the microcomputer 8, the focus control section 17 releases hold on the output and resumes the focus control. In this manner, a focus jump is complete. After that, the error between the focal point of the blue violet light beam and the first information layer 21 will be detected as a focus error signal by the photodetector 5, the preamplifier 6 and the focus error generator 7, and the focus control section 17, the focus actuator driver 9 and the objective lens holder 14 control the position of the objective lens 1 based on the focus error signal. That is to say, a feedback control is carried out such that the error between the focal point of the blue violet light beam and the layer C becomes equal to zero.

Hereinafter, it will be described in detail with reference to FIGS. 15 and 16 exactly how to make a focus jump according to this preferred embodiment. Portions (a) through (c) of FIG. 15 schematically show the S-curves of a focus error signal associated with multiple NAs for a three-layer optical disc 30.

Figure 15:
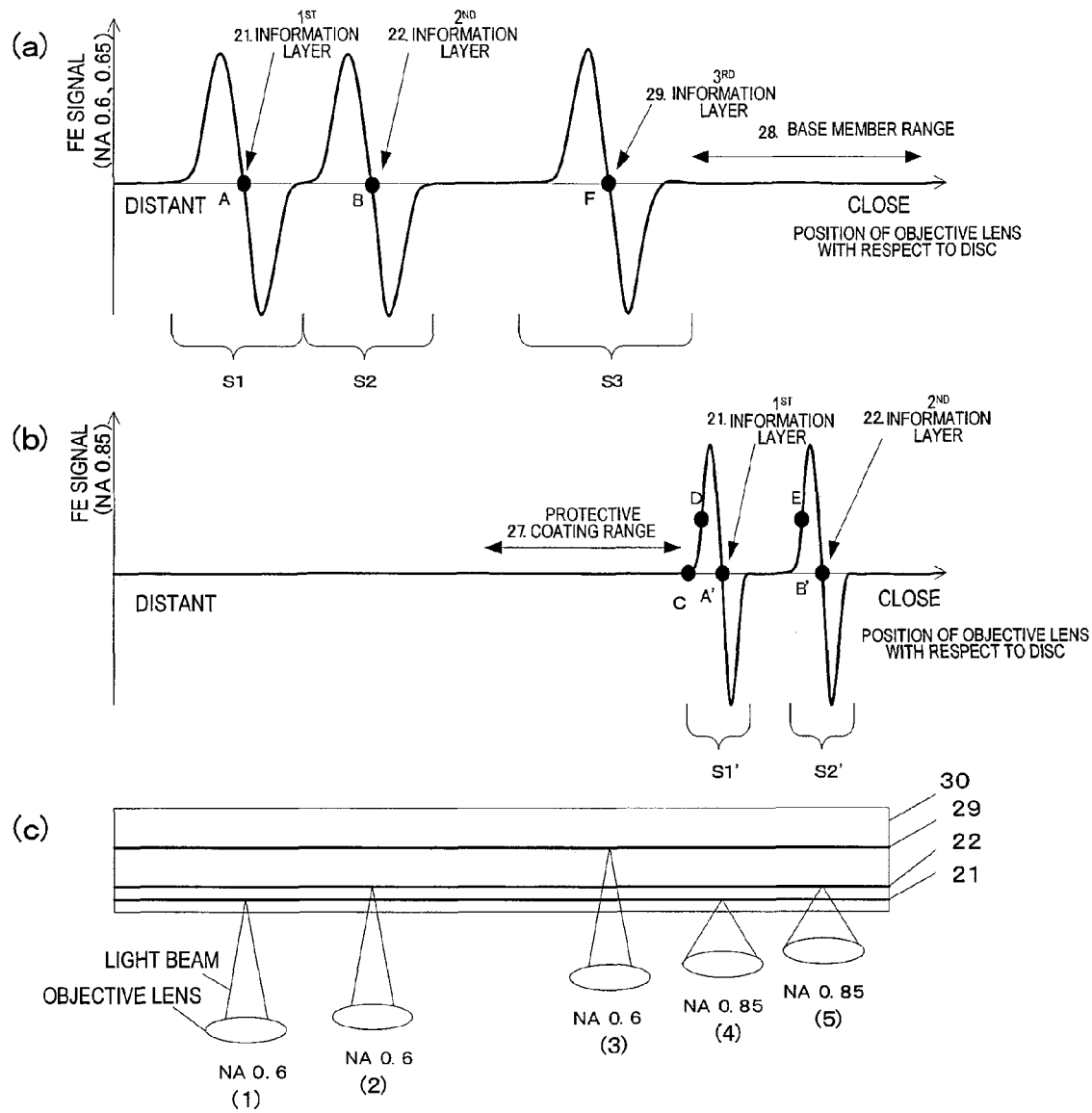
FIG. 15(a) shows focus error S-curves produced from a three-layer optical disc at an NA of 0.6.
FIG. 15(b) shows focus error S-curves produced from a three-layer optical disc at an NA of 0.85, and FIG. 15(c) schematically illustrates relations between objective lenses with different NAs and the three-layer optical disc.

In an optical system with an NA of 0.6 or 0.65, as the objective lens 1 is moved toward a three-layer optical disc 30 (having the structure shown in FIG. 14), three S-curves S1, S2 and S3 will be generated in the focus error signal as shown in portion (a) of FIG. 15 if the focus control is OFF. The points A and B shown in portion (a) of FIG. 15 correspond to the in-focus positions on the first and second information layers 21 and 22, respectively, and the point C corresponds to the in-focus position on the third information layer 29. On the other hand, in an optical system with an NA of 0.85, two S-curves S1' and S2' will be generated on the focus error signal as shown in portion (b) of FIG. 15. It should be noted that the point A' shown in portion (b) of FIG. 15 is the in-focus position for the first information layer 21 and the point B' is the in-focus position for the second information layer 22. Portion (b) of FIG. 15 shows only the S-curve S1' generated from the first information layer 21 that is located closer to the light-incoming side of the optical disc 30 and the S-curve S2' generated from the second information layer 22.

In the state (3) shown in portion (c) of FIG. 15, when a read operation is performed on the third information layer 29 using an optical system with an NA of 0.6, the objective lens 1 is located at a position corresponding to the point C of the S-curve S3 shown in portion (a) of FIG. 15. In such a state, a focus jump is made to the second information layer 22 and the NAs are changed. In this preferred embodiment, when the NAs are changed from 0.6 into 0.85, the objective lens 1 comes to have a shorter focal length. The variation (i.e., decrease in this case) in focal length is greater than the layer-to-layer distance of approximately 0.5 mm from the third information layer 29 to the first information layer 21. For that reason, even if the NAs are just changed from 0.6 into 0.85 with the objective lens 1 fixed at the same position, the focal point of the light beam will still be located shallower than the first information layer 21. That is why the objective lens 1 should be moved toward the optical disc 20.

According to this preferred embodiment, the NAs are changed from 0.6 into 0.85 after the focus control has been turned OFF and after the operation of moving the objective lens 1 toward the optical disc 20 has been started. Until the NAs are changed, the right half of the S-curve S3 of the focus error signal shown in portion (a) of FIG. 15, which is on the right-hand side of the point F (corresponding to the second information layer 22), is detected as the objective lens 1 is moved. If the NAs are changed from 0.6 into 0.85 either during or after the S-curve S3, then the focal point of the light beam will be closer to the objective lens 1 rather than the first information layer 21. That is why if the objective lens 1 is further moved toward the optical disc 20, the focal point will soon reach a position corresponding to the point C shown in portion (b) of FIG. 15. In this preferred embodiment, to jump to the second information layer 22, the objective lens 1 continues to be moved after the S-curve S1' has been passed and until the next S-curve S2' is detected.

The objective lens 1 is braked by the focus actuator 2 when its focal point is located at a position corresponding to the point E, thereby turning the focus control ON. In this manner, the objective lens 1 is controlled so as to stop at a position corresponding to the in-focus position B' of the S-curve S2' produced from the second information layer 22.

In the preferred embodiment described above, the focus jump is supposed to be made from the third information layer 29 to the second information layer 22. Alternatively, the focus jump may also be made from the third information layer 29 to the first information layer 21. Still alternatively, the focus jump may also be made the other way from the first or second information layer 21 or 22 to the third information layer 29.

Hereinafter, it will be described more fully with reference to FIG. 16 how to make a focus jump according to this preferred embodiment.

First, suppose a focus control is being carried out such that the focal point is located at the in-focus position of the third information layer 29 (corresponding to the point F shown in portion (a) of FIG. 15). In that case, the focus error signal continues to be approximately equal to zero as in the period preceding a time ta as shown in portion (a) of FIG. 16. In that period, the NA is 0.6.

Figure 16:
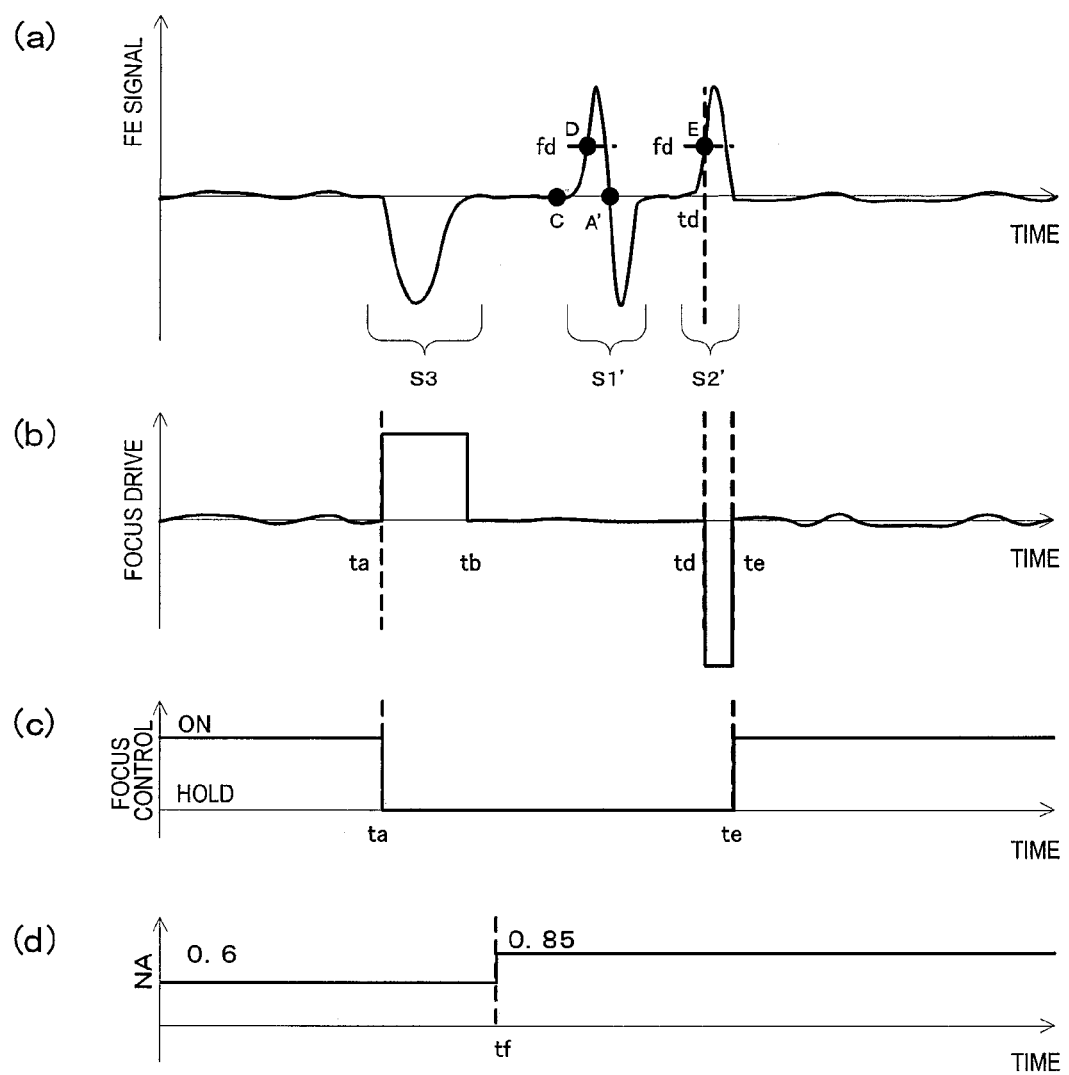
FIG. 16 shows NA change timing diagrams according to a fourth preferred embodiment, wherein portion (a) shows the waveform of a focus error signal during a focus jump operation, portion (b) shows the waveform of a focus drive signal during the focus jump operation, portion (c) shows the timings to turn ON and OFF a focus control during the focus jump operation, and portion (d) shows the timings to change NAs for the light beam during the focus jump operation.

At that time ta, the microcomputer 8 turns the focus control section 17 OFF and puts its output on hold as shown in portion (c) of FIG. 16. Meanwhile, the microcomputer 8 outputs a focus jump instruction to the jump direction and distance calculating section 31. In response, the jump direction and distance calculating section 31 controls the operation of the jump drive generating section 15 based on the direction and distance to go to reach the destination information layer and the variation in focal length caused by the change of NAs. In this example, the jump direction and distance calculating section 31 instructs the jump drive generating section 15 to move the objective lens 1 toward the optical disc 20. In accordance with this instruction, in the period between the times ta and tb, the jump drive generating section 15 outputs an accelerating pulse to the focus actuator driver 9 as shown in portion (b) of FIG. 16. As a result, the objective lens 1 starts to be moved toward the optical disc 30 by the focus actuator driver 9 and the focus actuator 2.

Next, to change the NAs from 0.6 into 0.85, the microcomputer 8 outputs a light beam NA change instruction to the NA changing section 13 at a time tf as shown in portion (d) of FIG. 16. In accordance with the instruction given by the microcomputer 8, the NA changing section 13 drives the NA changer 12, thereby changing the NAs from approximately 0.6 into approximately 0.85.

As the objective lens 1 is moved, the focal point of the light beam passes the first s-curve S1' as shown in portion (a) of FIG. 16. And when the focus error signal reaches a level fd (corresponding to the point E) at a time td, the jump drive generating section 15 outputs a decelerating pulse to the focus actuator driver 9 in accordance with the instruction given by the microcomputer 8 as shown in portion (b) of FIG. 16. As a result, the objective lens 1 is gradually decelerated and the jump drive generating section 15 stops outputting the decelerating pulse at a time te. At the same time, the microcomputer 8 turns the focus control section 17 ON again to finish the focus jump operation as shown in portion (c) of FIG. 16.

The time tf to change NAs for the light beam does not have to be within the interval after the accelerating pulse has finished being applied (at the time tb) and before the decelerating pulse starts to be applied (at the time td). Alternatively, the time tf may also be while the accelerating pulse is being output (i.e., between the times ta and tb).

In the preferred embodiment described above, the focus jump is supposed to be made between two information layers that require the change of NAs. As for the optical disc 30 shown in FIG. 14, however, a focus jump sometimes may be made between information layers that do not require any change of NAs. For example, to make a focus jump between the first and second information layers 21 and 22, the NA may remain 0.85. Also, when the optical disc drive is loaded with a normal multilayer optical disc, not a hybrid type, there is no need to change NAs, either, to make a focus jump. Considering these potential situations, when a focus jump instruction is issued, it should be determined whether or not to change the NAs and the direction to go for the objective lens needs to be determined based on the decision. Hereinafter, it will be described with reference to FIG. 22 how the optical disc drive should operate in such a situation.

First, while data is being read or written, or after data has been read or written, from/on a certain information layer, the microcomputer 8 gives a focus jump instruction to the jump direction and distance calculating section 31, which determines whether or not the NAs need to be changed (in Step S10). This decision is made by comparing the current NA value before the focus jump is made to that of the destination information layer of the focus jump. Information about the NA required by each information layer has already been retrieved as a piece of management information from the management area of the given optical disc either during the boot process or just after the optical disc has been loaded. And data that associates each information layer with its NA may be stored in a memory in the optical disc drive, for example. Such data is preferably stored in a table format. The destination of the focus jump is determined by the focus jump instruction issued by the microcomputer 8. Thus, the NA that will be required by the destination information layer of the focus jump is determined by reference to that data.

If the NA thus obtained about the destination layer of the focus jump is equal to the current NA (i.e., if there is no need to change NAs), the process advances to Step S14. In Step S14, the jump direction and distance calculating section 31 determines whether or not the destination information layer is located over the current information layer in the optical disc (i.e., more distant from the light incoming side of the optical disc). Since there is no need to change NAs in this case, the focal length will never change as a result of the focus jump. For that reason, if the destination information layer of the focus jump is located over the current information layer in the optical disc, then the direction to go for the objective lens (i.e., the jump direction) is defined to be upward in Step S20. Conversely, if the destination information layer is located under the current information layer in the optical disc (i.e., closer to the light-incoming side), then the direction to go for the objective lens is defined to be downward in Step S22. In either case, the distance to go for the objective lens is equal to the interval between the current information layer and the destination information layer.

Meanwhile, if it has been determined in Step S10 that the NAs should be changed, the process advances to Step S12, in which it is determined whether or not the NAs need to be increased to make a focus jump. If the answer is YES, then the focal length of the objective lens or the lens holder will shorten. That is why the objective lens should be moved toward the optical disc (i.e., upward in this case) in Step S16.

Referring back to FIG. 22, if it has been determined in Step S12 shown in FIG. 22 that the NAs need to be decreased, then the focal length of the objective lens will increase as already described with reference to portions (a) and (b) of FIG. 21. That is why the objective lens or the lens holder should be moved away from the optical disc (i.e., downward in this case) in Step S18.

If the NAs need to be changed, the distance to go for the objective lens or the objective lens holder is determined based on the gap between the current and destination information layers and the magnitude of shift of the focus position.

Once the direction to go for the objective lens or objective lens holder has been determined in this manner according to whether or not to change the NAs, the sign of the accelerating pulse to be applied by the jump drive generating section 15 (see FIG. 17) to the focus actuator driver 9 is determined based on that direction. The actual focus jump is performed as in the preferred embodiments described above.

As described above, according to any of various preferred embodiments of the present invention, the wavelengths and NAs for the light beam can be changed quickly with the focus control put on hold and without retracting the objective lens to its rest position (i.e., without performing the focus search operation all over again). Consequently, the present invention provides an optical disc drive that can change the wavelengths and NAs for the light beam in a much shorter time based on the result of the disc type recognition after the focus control operation has been performed and that can be booted much more quickly.

INDUSTRIAL APPLICABILITY

An optical disc drive according to the present invention changes the wavelengths or NAs for an optical system to make a focus jump without retracting the converging means from the disc. That is why the present invention is applicable effectively to optical discs with a hybrid structure. In addition, since the optical systems can be changed more quickly into an appropriate one for the type of the given optical disc just recognized, the performance of such an optical disc drive compatible with multiple types of optical discs by itself can be improved.

The invention claimed is:

1. An optical disc drive for reading and/or writing data from/on an optical disc with multiple information layers including first and second information layers, the optical disc being a hybrid optical disc in which in reading data from the first information layer with a light beam, wavelength and/or numerical aperture for the light beam are/is different from the one(s) used to read data from the second information layer, the drive comprising:

a light source that emits the light beam;

an objective lens that converges the light beam;

perpendicular move means for moving the objective lens perpendicularly to the information layers;

converged state detecting means for generating a signal representing how much the light beam has been converged on a target one of the information layers; and focus control means for forming a focal point of the light beam on the target information layer by driving the perpendicular move means in accordance with the signal, wherein while a focus jump is being made to shift the focal point of the light beam from the first information layer of the optical disc to the second information layer thereof by driving the perpendicular move means and moving the objective lens, wavelengths and/or numerical apertures for the light beam are changeable while the objective lens is moving.

2. The optical disc drive of claim 1, further comprising a jump direction determining section that determines, according a variation in the numerical aperture, which direction the objective lens should go while the focus jump is being made.

3. The optical disc drive of claim 2, wherein if it has been determined that the objective lens go toward the optical disc, a positive accelerating pulse and a negative decelerating pulse are applied in this order to the perpendicular move means, and wherein if it has been determined that the objective lens go away from the optical disc, a negative accelerating pulse and a positive decelerating pulse are applied in this order to the perpendicular move means.

4. The optical disc drive of claim 1, wherein while being accelerated during the focus jump, the perpendicular move means is given at least one pulse drive instruction, and wherein either while the pulse drive accelerate instruction is being issued or after the accelerate instruction has been given, the wavelengths or the numerical apertures for the light beam are changed.

5. The optical disc drive of claim 1, wherein after the wavelengths or the numerical apertures for the light beam have been changed and when an output signal of the converged state detecting means reaches a predetermined level, a decelerate instruction is given to the perpendicular move means.

6. The optical disc drive of claim 1, wherein while the wavelengths or the numerical apertures are being changed for the light beam, the focus control means puts a drive signal for the perpendicular move means on hold.

* * * * *